(12) United States Patent
Zhao et al.

(10) Patent No.: US 10,519,555 B2
(45) Date of Patent: Dec. 31, 2019

(54) CATALYTIC ASSEMBLY

(71) Applicant: NEWSOUTH INNOVATIONS PTY LIMITED, Sydney, New South Wales (AU)

(72) Inventors: Chuan Zhao, Randwick (AU); Xunyu Lu, Maroubra (AU)

(73) Assignee: NewSouth Innovation Pty Limited, Sydney, New South Wales (AU)

( * ) Notice: Subject to any disclaimer, the term of this patent is extended or adjusted under 35 U.S.C. 154(b) by 0 days.

(21) Appl. No.: 15/503,390

(22) PCT Filed: Aug. 11, 2015

(86) PCT No.: PCT/AU2015/000478
§ 371 (c)(1),
(2) Date: Feb. 11, 2017

(87) PCT Pub. No.: WO2016/023065
PCT Pub. Date: Feb. 18, 2016

(65) Prior Publication Data
US 2017/0226648 A1    Aug. 10, 2017

(30) Foreign Application Priority Data

Aug. 11, 2014 (AU) ............................. 2014903122

(51) Int. Cl.
*C25B 11/03* (2006.01)
*C25B 11/04* (2006.01)
(Continued)

(52) U.S. Cl.
CPC ............ *C25B 11/0405* (2013.01); *C25B 1/04* (2013.01); *C25B 11/035* (2013.01); *C25B 11/04* (2013.01);
(Continued)

(58) Field of Classification Search
CPC .......................... C25B 11/035; C25B 11/0405
See application file for complete search history.

(56) References Cited

U.S. PATENT DOCUMENTS 4,167,607 A * 9/1979 de Nora ................ C25B 11/035
429/51
4,916,106 A   4/1990 Koschlig et al.
(Continued)

FOREIGN PATENT DOCUMENTS

CN      101748426 A     6/2010
CN      101781769 A     7/2010
(Continued)

OTHER PUBLICATIONS

International Search Report and Written Opinion for International Application No. PCT/AU2015/000478, dated Sep. 16, 2015 (9 pages).
(Continued)

*Primary Examiner* — Cam N. Nguyen
(74) *Attorney, Agent, or Firm* — Michael Best & Friedrich LLP

(57) ABSTRACT

Disclosed herein is a catalytic assembly comprising a porous electrically conductive substrate, and a porous metallic composite coating the substrate, where the catalytic assembly has a three dimensional interpenetrating porous structure, where the substrate has a three dimensional interpenetrating porous structure having a first average pore diameter ($PD_{SUB}$), and the porous metallic composite is amorphous and has a three dimensional interpenetrating porous structure having a second average pore diameter ($PD_{PMC}$), the $PD_{PMC}$ being sufficiently smaller than the $PD_{SUB}$ to allow the porous metallic composite to coat substrate surfaces throughout the substrate including surfaces of pores in the substrate. The catalytic assembly may be suitable for use as
(Continued)

oxygen evolution reaction (OER) catalysts and hydrogen evolution reaction (HER) catalysts, among others.

20 Claims, 20 Drawing Sheets

(51) Int. Cl.
    *C25D 3/56*     (2006.01)
    *C25D 5/40*     (2006.01)
    *C25D 7/00*     (2006.01)
    *C25B 1/04*     (2006.01)

(52) U.S. Cl.
    CPC ...... *C25B 11/0415* (2013.01); *C25B 11/0447* (2013.01); *C25D 3/562* (2013.01); *C25D 5/40* (2013.01); *C25D 7/00* (2013.01); *Y02E 60/366* (2013.01)

(56) References Cited

U.S. PATENT DOCUMENTS

| | | | | |
|---|---|---|---|---|
| 7,026,266 B2* | 4/2006 | Chaudhari | ............ | B01J 27/188 502/155 |
| 7,488,547 B1* | 2/2009 | Iacovelli | ............ | H01M 4/8626 429/434 |
| 7,594,982 B1* | 9/2009 | Roscheisen | ......... | H01L 31/1884 136/263 |
| 8,211,593 B2* | 7/2012 | Gu | ......... | B82Y 30/00 429/524 |
| 8,339,768 B2* | 12/2012 | Park | ......... | H01G 9/058 361/502 |
| 8,378,877 B2* | 2/2013 | Tishin | ............ | C04B 38/02 342/1 |
| 9,107,292 B2* | 8/2015 | Shah | ............ | H05K 9/009 |
| 9,139,917 B2* | 9/2015 | O'Brien | ............ | C03C 17/006 |
| 9,647,263 B2* | 5/2017 | Green | ............ | B82Y 30/00 |
| 9,675,934 B2* | 6/2017 | Difrancesco | ............ | B01J 35/04 |
| 9,805,880 B2* | 10/2017 | Warren | ............ | C25D 11/26 |
| 2011/0224066 A1 | 9/2011 | Schmidt et al. | | |
| 2013/0168228 A1 | 7/2013 | Ozin et al. | | |
| 2014/0031200 A1 | 1/2014 | Son et al. | | |

FOREIGN PATENT DOCUMENTS

| | | |
|---|---|---|
| CN | 102787329 A | 11/2012 |
| CN | 103952719 | 7/2014 |
| GB | 1453480 | 10/1976 |
| WO | 2007082898 | 7/2007 |

OTHER PUBLICATIONS

Li Yan-wei et al. "Progress in Research on Amorphous Nickel Hydroxide Electrode Materials" Modern Chemical Industry, vol. 30 No. 2 pp. 25-27and 29 published Feb. 28, 2010.

Dai, H. B. et al., "High—performance cobalt—boron catalyst supported on Ni form for hydrogen generation from alkaline sodium borohydride solution," International Journal of Hydrogen Energy, NL, Elsevier, 2008, Aug. 12, 2016, vol. 33, pp. 4405-4412.

Castro, E. B. et al., "Electrochemical characterization of porous nickel—cobalt oxide electrodes," International Journal of Hydrogen Energy, NL, Elsevier, (2004) vol. 29, pp. 255-261.

Smith, R. D. L et al., "Water Oxidation Catalysis: Electrocatalytic Response to Metal Stoichiometry in Amorphous Vletal Oxide Films Containing iron, Cobalt, and Nickel," Journal of the American Chemical Society, United States, Jul. 24, ACS Publications, 2013, vol. 135, pp. 11580-11586.

English Translation of Search Report issued from the Chinese Patent Office for related Application No. 201580042668.5 dated Feb. 2, 2019 (3 Pages).

Li Yan-wei et al. "Progress in Research on Amorphous Nickel Hydroxide Electrode Materials" Modem Chemical Industry, vol. 30 No. 2 pp. 25-27and 29 published Feb. 28, 2010.

English Translation of Li Yan-wei et al. "Progress in Research on Amorphous Nickel Hydroxide Electrode Materials" Modern Chemical Industry, vol. 30 No. 2 pp. 25-27and 29 published Feb. 28, 2010.

\* cited by examiner

CATALYTIC ASSEMBLY

TECHNICAL FIELD

The present invention relates to catalytic assemblies and to methods of their preparation. It also relates to electrodes comprising the catalytic assemblies. The catalytic assemblies are suitable for use as oxygen evolution reaction catalysts and hydrogen evolution reaction catalysts, amongst others.

BACKGROUND

The increasing demands for clean energy have triggered tremendous research interests on electrochemical energy conversion and storage systems with minimum environmental impact. Electrolysis of water into hydrogen and oxygen provides a promising strategy to store electricity generated from renewable energy sources such as solar and wind. Development of efficient, inexpensive water electrolysis systems, combined with hydrogen fuel cells, will provide continuous usage of intermittent renewable energies with minimum environmental impact. One of the key challenges in commercialization of these systems is to develop electrode materials of high efficiency and low cost.

To replace the precious metal based oxygen evolution reaction (OER) catalysts, e.g. $IrO_2$ and $RuO_2$ in commercial water electrolyzers, non-precious metal based catalysts need to meet the strict requirements, including high current densities (j) ($\geq 500$ mA cm$^{-2}$) at low overpotentials ($\leq 300$ mV), and prolonged durability. First-row transition metals, such as Ni, Co and Fe, have been an active area of research during the past few years due to their comparable performances in electrochemical energy systems and significantly lowered costs compared with the precious metals, e.g. iridium, ruthenium and platinum. For example, nickel and nickel based composites are known to be active catalyst materials for OER, which require an overpotential around 350~450 mV to deliver a j of 10 mA cm$^{-2}$. Interestingly, metallic composites containing two or several of these metals often exhibit significantly enhanced electrochemical performances, and can satisfy specific applications by adjusting the compositions of the composites. For instance, the incorporation of Fe into nickel oxide (NiO) or nickel hydroxide (Ni(OH)$_2$), either as impurities or the components, results in a greatly improved OER catalytic performance. Furthermore, NiFe and NiFeCo composites have shown considerably high catalytic activity towards OER, and NiCo alloy composites are identified as promising electrocatalysts for hydrogen evolution reaction (HER).

However, known research published to date has failed to achieve results using first-row transition metals that are comparable to precious metal based OER catalysts.

A number of techniques for preparing bimetallic composite electrodes, for example NiFe oxygen electrodes have been described. In a first approach for preparing NiFe based oxygen electrodes, NiFe composites are prepared in bulk and are subsequently coated onto desired substrates with the aid of chemical binders which are generally polymeric in nature. These binders are necessary to build up a robust oxygen electrode, since without the binders, the catalysts loaded onto the substrates can be easily peeled off by the bubbles generated. However, the binders are normally electrical insulating, which will not only decrease the contact area between the electrolytes and the active sites but also diminish the electrical conductivity of the NiFe catalyst, thus leading to greatly receded electrocatalytic performances, greatly inferior to precious metal based OER catalysts.

The second approach for preparing such NiFe oxygen electrodes is to electrodeposit NiFe composites directly onto the surface of 2D planar substrates, such as plates of nickel, stainless steel, platinum and copper. This method only requires simple equipment and the deposits can be easily tuned by adjusting the deposition parameters. Furthermore, the electrodeposited catalysts have certain affinity to the supporting substrates, thereby avoiding the usage of chemical binders. However, catalysts deposited on planar structures always have very limited accessible active sites, since only the few outermost layers are available for OER to take place. Furthermore, bubbles generated during OER tend to accumulate in these 2D structures, which results in voltage drops by blocking the active sites on catalysts and impeding the ionic transportation, again providing performance greatly inferior to precious metal based OER catalysts. Eventually, a considerable amount of bubble overpotential (additional potential required to overcome the voltage drop caused by bubbles formation) is required especially under high current densities.

It would be advantageous to provide a catalytic assembly as an alternative to precious metal based catalysts, which uses metallic composites, and which achieve excellent electrocatalytic performances and prolonged durability. It would also be advantageous to provide electrodes comprising these catalytic assemblies, particularly those that are efficient catalysts towards OER and/or HER.

SUMMARY OF THE INVENTION

The present inventors have undertaken considerable research and have for the first time demonstrated that amorphous porous metallic composite supported on the surfaces of three dimensional interpenetrating porous substrates, the average pore diameter of the substrate being sufficiently larger than that of the metallic composite, can be used as efficient catalysts towards OER, HER and in other catalytic applications, without the use of expensive precious metals and which can be achieved through inexpensive processing techniques.

According to a first aspect of the present invention, there is provided a catalytic assembly comprising
a porous electrically conductive substrate, and
a porous metallic composite coating the substrate,
where the catalytic assembly has a three dimensional interpenetrating porous structure,
where the substrate has a three dimensional interpenetrating porous structure having a first average pore diameter ($PD_{SUB}$), and
the porous metallic composite is amorphous and has a three dimensional interpenetrating porous structure having a second average pore diameter ($PD_{PMC}$), the $PD_{PMC}$ being sufficiently smaller than the $PD_{SUB}$ to allow the porous metallic composite to coat substrate surfaces throughout the substrate including surfaces of pores in the substrate.

This is described and supported by the experimental detail outlined below.

The $PD_{PMC}$ may range from approximately 5 nm to 300 nm.

The porous metallic composite supported on the electrically conductive porous substrate may have a thickness of between approximately 5 nm and 100 nm. More preferably, the porous metallic composite may have a thickness of between approximately 5 nm and 50 nm.

The porous metallic composite supported on the electrically conductive porous substrate may comprise nanosheets and/or nanoflakes.

Typically, in the embodiment in which the porous metallic composite is comprised essentially of nanosheets, the thickness of the porous metallic composite is approximately in the range of 5-20 nm, more preferably in the range of approximately 10 nm. In this embodiment, the $PD_{PMC}$ may range from 10 nm to 100 nm, preferably 50 nm.

Typically, in the embodiment in which the porous metallic composite is comprised essentially of nanoflakes, the thickness of the porous metallic composite is approximately in the range of 20-100 nm, more preferably 50 nm. In this embodiment, the $PD_{PMC}$ may range from 100 to 300 nm, preferably 200 nm.

Generally, in the embodiment in which the porous metallic composite is comprised essentially of nanosheets, the $PD_{PMC}$ ranges are smaller than the embodiment in which the porous metallic composite is comprised essentially of nanoflakes.

In an embodiment, the porous electrically conductive substrate of the catalytic assembly may have a $PD_{SUB}$ in the range of approximately 50,000 nm to approximately 1,000,000 nm. More preferably, the $PD_{SUB}$ may be in the range of approximately 100,000 nm to approximately 500,000 nm. More preferably still, the $PD_{SUB}$ may be in the range of approximately 100,000 nm to approximately 200,000 nm.

In an embodiment, the porous metallic composite of the catalytic assembly may comprise at least one metal, which may be a transition metal, and preferably a first row transition metal. More preferably still, the first row transition metal is iron.

In an embodiment, the porous metallic composite of the catalytic assembly may comprise at least two metals, which may be transition metals, and preferably at least one of which is a first row transition metal. More preferably still, the at least one first row transition metal is iron.

In an embodiment, the porous metallic composite of the catalytic assembly comprises a bimetallic composite, such a bimetallic oxide composite or a bimetallic hydroxide composite. Examples include oxide composites or hydroxide composites of nickel-iron, nickel-cobalt, manganese-iron, manganese-nickel, manganese-cobalt or manganese-zinc.

The bimetallic composite may be, for example, a nickel-iron composite, such as a nickel-iron hydroxide composite, for example $Ni_3Fe(OH)_9$.

The bimetallic composite may be, for example, a nickel-cobalt composite, such as a nickel-cobalt hydroxide composite.

In an embodiment, the porous metallic composite of the catalytic assembly may comprise at least three metals, which may be transition metals, and preferably at least one of which is a first row transition metal. More preferably still, the at least one first row transition metal is iron.

In an embodiment, the porous metallic composite of the catalytic assembly comprises a trimetallic composite, such a trimetallic oxide composite or a trimetallic hydroxide composite. Examples include oxide composites or hydroxide composites of nickel-cobalt-iron, manganese-cobalt-nickel and molybdenum-cobalt-nickel.

In the embodiments described above, the porous metallic composite may include transition metals other than first row transition metals, for example molybdenum.

The porous metallic composite may exhibits catalytic activity towards, for example OER and/or HER.

In an embodiment, the porous metallic composite is a continuous layer which coats the surfaces of approximately all of the pores in the substrate.

In an embodiment, the porous electrically conductive substrate is a foam, such as a metal foam. Examples comprise nickel foam, aluminium foam, graphite foam, nickel-iron foam, copper foam and titanium foam.

Preferably, the porous electrically conductive substrate is nickel foam.

In an embodiment, the porous metallic composite is deposited on to the substrate surfaces throughout the substrate including surfaces of pores in the substrate by electrodeposition.

According to a second aspect of the present invention, there is provided a method of preparing a catalytic assembly, the method comprising the steps of:
  (i) providing a porous electrically conductive substrate having a three dimensional interpenetrating porous structure and having a first average pore diameter ($PD_{SUB}$); and
  (ii) coating substrate surfaces throughout the substrate including surfaces of the pores in the substrate with a porous metallic composite having a second average pore diameter ($PD_{PMC}$);
  the porous metallic composite being amorphous and having a three dimensional interpenetrating porous structure, and the $PD_{PMC}$ being sufficiently smaller than the $PD_{SUB}$ to allow the porous metallic composite to coat surfaces of pores in the substrate, the catalytic assembly having a three dimensional interpenetrating porous structure.

In one embodiment of the method of the invention, step (ii) of the method does not include the use of binders to adhere the porous metallic composite to substrate surfaces.

In one embodiment of the method of the invention, step (ii) comprises electrodepositing the porous metallic composite on to the substrate surfaces throughout the substrate including internal surfaces of pores in the substrate, preferably using a standard three-electrode electrochemical cell.

In an embodiment, the electrodeposition of the porous metallic composite is carried out using an electrolyte bath which comprises equimolar electrolytes of $Ni^{2+}$ and $Fe^{2+}$, such as, for example, 3 mM $Ni(NO_3)_2.6H_2O$ and 3 mM $Fe(NO_3)_3.9H_2O$.

In an embodiment, the electrodeposition of the porous metallic composite is carried out using an electrolyte bath which comprises equimolar electrolytes of $Ni^{2+}$, $Co^{2+}$, and $Fe^{2+}$.

In an embodiment, the electrodeposition of the porous metallic composite is carried out using an electrolyte bath which comprises with x mM $Ni(NO_3)_2.6H_2O$, x mM $Co(NO_3)_3.6H_2O$ and y mM $Fe(NO_3)_3.9H_2O$, where 2x+y=5. In this embodiment, the value of y may be zero. In a further embodiment, both x and y may both equal 1.67.

The method of the invention may further comprise the step of pre-treating the surface of the porous electrically conductive substrate to remove any oxide layer and/or contaminants prior to step (ii).

In one embodiment, the method of the invention may comprise the further steps of:
  (iii) rinsing the product of step (ii) with water and ethanol and;
  (iv) drying the product of step (iii) in air.

The present invention also provides an electrode comprising the catalytic assembly of the first aspect of the invention.

The present invention also provides an electrode comprising the catalytic assembly prepared according to the method of the second aspect of the invention.

The catalytic assemblies described above, which can be used as electrodes per se (i.e. the catalytic assembly, as prepared, can be used as an electrode), may be efficient catalysts towards OER and/or HER, and in other catalytic applications.

BRIEF DESCRIPTION OF THE FIGURES

In the following detailed description, the following Figures are referred to, in which.

DEFINITIONS

Figure 1:
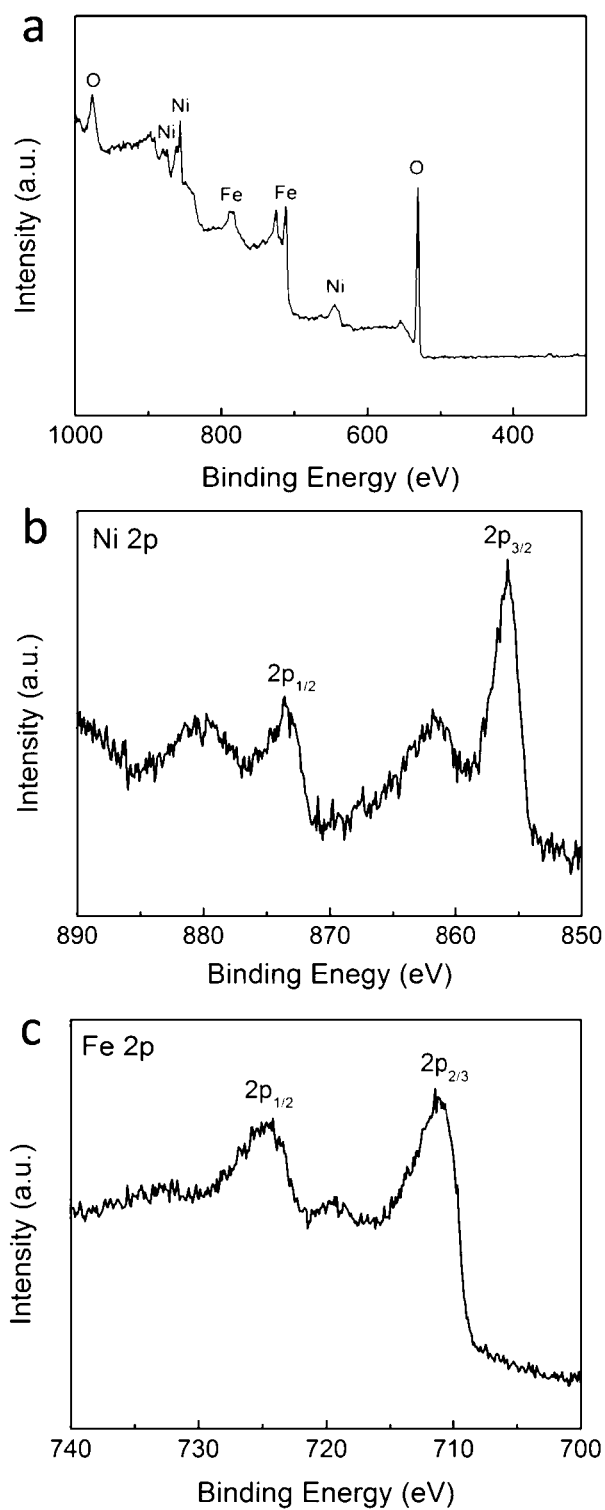
FIG. 1 shows (a) XPS survey spectra of NiFe composites deposited on Pt electrode and (b, c) show high resolution XPS spectra of Ni 2p and Fe 2p, respectively.

As used herein, the following terms are considered to have the following meanings:

"metallic composite" a composite comprising a metal and at least one other element, where the at least one other element may or may not be a metal "metallic oxide composite" a metallic composite comprising at least one metal oxide "metallic hydroxide composite" a metallic composite comprising at least one metal hydroxide "nanosheet" a sheet-like structure having a substantially planar type three dimensional structure having a substantially constant width in one dimension, and extending from several nanometers to several hundred nanometers in each other dimension.

"nanoflake" flake-like three dimensional structure, extending from several nanometers to several hundred nanometers in each dimension.

"nanoporous" having pores in the nanometer scale and can be subdivided into three further categories being mesopores, micropores and macropores.

"microporous" having pores of size between 0.2 to 2 nm

"mesoporous" having pores of size between 2 nm to 50 nm

"macroporous" having pores of size between 50 nm to 1000 nm

"ultrathin" having a thickness of approximately less than 10 nm.

DETAILED DESCRIPTION

In a first aspect, the present invention provides a catalytic assembly. The catalytic assembly comprises a porous electrically conductive substrate and a porous metallic composite coating the substrate. The catalytic assembly has a three dimensional interpenetrating porous structure. The substrate also has a three dimensional interpenetrating porous structure having a first average pore diameter ($PD_{SUB}$). The porous metallic composite is amorphous and has a three dimensional interpenetrating porous structure having a second average pore diameter ($PD_{PMC}$). The $PD_{PMC}$ is sufficiently smaller than the $PD_{SUB}$ to allow the porous metallic composite to coat substrate surfaces throughout the substrate including surfaces of pores in the substrate.

It is an essential feature of the substrate that it is an electrically conductive porous material. Preferably, where the eventual use of the catalytic assembly is for OER and/or HER, the substrate should not be active in water i.e. should be inert and not deteriorate in aqueous solutions. An advantage of using metal foam, such as for example nickel foam, is that it exhibits these favourable characteristics and is commercially available and relatively inexpensive. A further advantage of metal foams is that they are robust, and where weight considerations are a factor for the final use of the catalytic assembly, they provide excellent weight efficiency.

The hierarchical nature of the pore structure of the catalytic assembly, with the $PD_{SUB}$ being substantially larger than that of the $PD_{PMC}$ allows for the majority of the surfaces of the pores in the substrate to be coated by the porous metallic composite, without the pores of the substrate becoming blocked during formation of the porous metallic composite.

In the catalytic assembly, the three dimensional interpenetrating porous structure of the substrate allows for a high catalyst loading without sacrificing the amount of accessible active sites. The catalytic assembly of the present invention exploits the feature of the significantly larger $PD_{SUB}$ relative to $PD_{PMC}$ to allow for coverage of the porous metallic composite to coat internal surfaces of pores in the substrate and provide a three dimensional interpenetrating porous structure. It should be appreciated that this structure maximises the effective surface area for the catalytic reaction to occur.

When used as an electrode, this hierarchical pore arrangement of the catalytic assembly (i.e. that arrangement in which $PD_{SUB}$ is significantly large relative to $PD_{PMC}$) in combination with the three dimensional interpenetrating porous structure of the substrate, enhances the efficiency of the electrode by facilitating the dissipation of by-products of the catalytic reaction. That is, when used as an electrode, bubbles tend to move away from where they initially form on the hierarchical pore arrangement of the catalytic assembly and the three dimensional interpenetrating porous structure of the substrate reduces the tendency of bubbles from accumulating at the surface of the electrode. These features also minimize the possibility of the layer from peeling off the substrate as a result of mechanical stress.

As mentioned above, the porous metallic composite is amorphous and coats substrate surfaces throughout the substrate including surfaces of pores in the substrate. The as-deposited porous metallic composite is not subjected to any thermal treatment in order to transform the microstructure of the as-deposited porous metallic composite. The amorphous nature of the porous metallic composite provides enhanced catalytic activity when compared to the crystalline metallic composite. The inventors believe that heating to create crystalline structure within the metallic composite may encourage formation of components that reduce the catalytic activity of the metallic composite. For example, when the metallic composite is a nickel-iron composite, applying a thermal treatment may result in some iron oxide components being generated. Iron oxide has no catalytic activity for OER and therefor reduces the performance of the metallic composite layer in OER applications.

Furthermore, the inventors also believe that maintaining the amorphous nature of the metallic composite is likely to maintain the integrity of the porous structure of the metallic composite. That is, a thermal treatment of the porous amorphous metallic composite which coats the substrate may cause the metallic composite to collapse and thereby diminish the porosity of the metallic composite.

Typically, the $PD_{PMC}$ ranges from approximately 5 nm to 300 nm.

Typically, the thickness of the porous metallic composite may have a thickness of between approximately 5 nm and 100 nm, more preferably between 5 and 50 nm.

Typically the $PD_{SUB}$ ranges from approximately 50,000 nm to 1,000,000 nm, more typically from approximately 100,000 nm to 500,000 nm, and even more typically from 100,000 nm to 500,000 nm.

As described above, the porous metallic composite has a $PD_{PMC}$ substantially smaller than $PD_{SUB}$. The thickness of the porous metallic composite is also substantially smaller than $PD_{SUB}$ and this arrangement further facilitates the porous metallic composite coating the substrate surfaces throughout the substrate including surfaces of pores in the substrate and provides a large effective surface area for the catalytic reaction to occur.

Through judicious choice of the substrate and the metallic composite, the hierarchical pore arrangement can be controlled. That is, the ratio of the $PD_{SUB}$ to $PD_{PMC}$ can be controlled according to the materials chosen. The thickness of the porous metallic composite can also be controlled in this way. The thickness of the porous metallic composite also depends on the preparation conditions of the composite. For example, when the porous metallic composite is deposited using the electrodeposition method, varying factors such as the temperature of the electrolytic solution, the composition of the electrolytes (i.e. choice of electrolytes) and their concentration in the electrolyte solution, and the deposition time, will affect the ultimate thickness and microstructure of the porous metallic composite. These factors can be altered to control and optimise the properties of the porous metallic composite.

The porous metallic composites may be comprised of nanosheets. For example, the metallic composites may be comprised of nanosheets which are generally planar. Although general planar, the nanosheets may exhibit a rippled effect. The nanosheets are generally ultrathin and the metallic composite comprised of these nanosheets may have a thickness of between approximately 5 and 20 nm, more typically approximately 10 nm. The nanosheets may extend in the ranges from 50 nm to several hundred nanometers. These nanosheets are interconnected, forming the porous metallic composite.

Where the porous metallic composite is comprised of nanosheets, the $PD_{PMC}$ may range from 10 nm to 100 nm, preferably 50 nm.

The metallic composites may be comprised of nanoflakes. For example, the metallic composites may be comprised of nanoflakes which are highly curved and rippled. The metallic composite comprised of these nanoflakes may have a thickness of generally in the range of 20-100 nm and typically 50 nm. The nanoflakes are interconnected forming the pores of the metallic composite.

Where the metallic composite is comprised of nanoflakes, the average pore diameter of the metallic composites is generally greater than that of the metallic composites comprised of nanosheets. The average pore diameters of the metallic composites comprised of nanoflakes are generally in the range of 100-300 nm and typically 200 nm.

The pores of the porous metallic composite are created via the interconnection and curves of the nanosheet and/or nanoflakes when the metallic composite is deposited on the surface of the substrate. That is, the nanosheets and the nanoflakes are not porous in themselves.

The porous metallic composites may be comprised of nanoflakes and nanosheets.

In some embodiments, the porous metallic composite layer comprises at least one metal, such as a transition metal. In some embodiments, the at least one transition metal is a first-row transition metal. In some embodiments, the first-row transition metal is iron.

In some embodiments, the porous metallic composite layer comprises at least two metals. In such embodiments the at least two metals are transition metals. In some embodiments, the at least two transition metals are first-row transition metals. In some embodiments, at least one of the first-row transition metals is iron.

In some embodiments, the metallic composite comprises a bimetallic composite, for example a bimetallic oxide composite or a bimetallic hydroxide composite. In such embodiments, the porous metallic composite layer may, for example, comprise an oxide composite or a hydroxide composite of any one of NiFe, NiCo, MnFe, MnNi, MnCo or MnZn.

In some embodiments, the porous metallic composite layer comprises at least three metals. In such embodiments the at least three metals are transition metals. In some embodiments, the at least three transition metals are first-row transition metals. In some embodiments, at least one of the first-row transition metals is iron.

In some embodiments, the metallic composite comprises a trimetallic composite, for example a trimetallic oxide composite or a trimetallic hydroxide composite. In such embodiments, the porous metallic composite layer may be, for example, an oxide or hydroxide composite of nickel-cobalt-iron, manganese-cobalt-nickel or molybdenum-cobalt-nickel.

In some embodiments the porous metallic composite is a continuous layer which coats the surfaces of approximately all of the pores in the substrate. The metallic composite layer tends to attach to the skeleton of the substrate, which faithfully replicates the porous structure of the nickel foam substrate. The catalyst films formed on the skeleton of the foam are active sites for example, OER, to take place.

In some embodiments it may not be necessary to entirely coat the surface of the substrate. For example, where the substrate itself will not be chemically active in the chemical reaction for which the catalytic assembly is to be used, and some exposure of the substrate will not contaminate the chemical reaction. It should be appreciated that coating the substrate in its entirety may provide optimum performance, but may not be necessary for the catalytic assembly to be fit for purpose.

In some embodiments, the porous electrically conductive substrate is a foam. In such embodiments, the foam may be selected from the group consisting of nickel foam, aluminium foam, graphite foam, nickel-iron foam, copper foam or titanium foam.

For example, the substrate employed may be nickel foam (NF) which is highly conductive. Highly conductive substrates will further facilitate the electron transport during the electrocatalytic reaction e.g. OER and reduces the electrical resistance.

In some embodiments, the porous metallic composite layer is deposited onto the substrate surfaces throughout the substrate including surfaces of pores in the substrate by electrodeposition. The fact that the porous substrate is conductive further facilitates this deposition technique.

However, the scope of the invention is not limited to electrodeposition. Other coating techniques may be employed, such as, for example, sol-gel processing and chemical vapour deposition techniques.

According to a second aspect, the present invention provides a method of preparing the catalytic assembly of the first aspect, the method comprising the step of:
(i) providing a porous electrically conductive substrate having a three dimensional interpenetrating porous structure and having a first average pore diameter ($PD_{SUB}$); and
(ii) coating substrate surfaces throughout the substrate including surfaces of the pores in the substrate with a porous metallic composite having a second average pore diameter ($PD_{PMC}$);
the porous metallic composite being amorphous and having a three dimensional interpenetrating porous structure, and the $PD_{PMC}$ being sufficiently smaller than the $PD_{SUB}$ to allow the porous metallic composite to coat surfaces of pores in the substrate, the catalytic assembly having a three dimensional interpenetrating porous structure.

Typically the method of the invention does not require the use of binders to attach the porous metallic composite to the substrate surfaces. Electrodeposition lends itself to the method of the invention. This electrodeposition technique is simple and straightforward and can be easily realized in industry and scaled-up to meet large-scale industrial needs. The electrodeposition may be carried out using a standard three-electrode electrochemical cell.

Importantly, electrodeposition of the porous metallic composite layer does not require the use of binders to bind the metallic composite layer to the substrate surfaces, thus avoiding the interference of a binding layer between the metallic composite layer and the surfaces of the substrate. Polymeric binders tend to impede the charge transport during catalytic reactions. Having the electrodeposited metallic composite layer deposited directly onto the 3-D porous skeleton of the substrate, in the absence of any polymeric binders, ensures good electrical contact between the metallic composite layer and the substrate. This is particularly important when the catalytic assembly is used as an electrode.

Furthermore, the electrodeposition technique allows for a simplistic approach to varying the stoichiometry of the eventual porous metallic composite by varying the electrolyte components in the electrolytic bath as well as the molar ratios of these electrolytes. This is further described in the examples described below.

According to an embodiment, the method may further comprise the step of pre-treating the surface of the porous electrically conductive substrate to remove any oxide layer and/or contaminants prior to step (i).

According to an embodiment, the method may further comprise the steps of:
(iii) rinsing the product of step (ii) with water and ethanol and;
(iv) drying the product of step (iii) in air.

The catalytic assembly of the present invention, prepared according to the methods described above may be used as an electrode per se, and may exhibit catalytic activity OER and/or HER.

Various embodiments of the present invention are described with reference to the following examples.

Example 1—Bimetallic Complex of NiFe on NF

Preparation of NiFe/NF

NF (thickness: 1.6 mm, bulk density: 0.45 g cm$^{-3}$, Goodfellow) was sonicated in 5 M HCl solution for 20 minutes to remove the $NiO_x$ layer on the surface, and rinsed subsequently with water and ethanol, then dried in air. The electrodeposition was carried out in a standard three-electrode electrochemical cell. NF was used as the working electrode, with a parallel positioned platinum plate auxiliary electrode and a Ag/AgCl (3 M KCl) reference electrode. The electrolyte bath contained 3 mM $Ni(NO_3)_2 \cdot 6H_2O$ and 3 mM $Fe(NO_3)_3 \cdot 9H_2O$, and cooled to ~10° C. To optimize the compositions of the NiFe deposit, the total moles of $Ni^{2+}$ and $Fe^{3+}$ in the electrolyte were maintained at 6 mM while the molar ratio of $Ni^{2+}$ and $Fe^{3+}$ systematically varied. The constant potential electrodeposition was carried out with a CHI 760D Electrochemical Workstation (CH Instrument) at −1.0 V (vs. Ag/AgCl) for 300 s.

After deposition, the NF was carefully withdrawn from the electrolyte, rinsed with water and ethanol, then sonicated briefly in ethanol, and left to dry in air. For comparison, NiFe composites were also electrodeposited onto GC (0.07 cm2) and Pt (0.196 cm2) electrodes following the same procedures. To prepare the Ir/C coated GC electrode, 5 mg of Ir/C (20 wt % of Ir, Premetek Co.) was dispersed in 1 ml of water and ethanol solution (1:1, v/v), followed by the addition of 25 µl of Nafion 117 solution (Sigma-Aldrich). The mixture was then sonicated briefly to form a homogenous ink 3 µl of the ink was drop-casted onto the surface of the 0.07 cm2 GC electrode and left dried in air. The amount of Ir loaded onto GC electrode was 40 µg cm-2.

Physical Characterization of NiFe/NF

XPS was performed on a Thermo ESCALAB250i X-ray Photoelectron Spectrometer. SEM was carried out using a FEI Nova NanoSEM 230 with a 10 kV accelerating voltage. TEM was performed using a Philips CM 200 microscope. XRD was performed on a PANalytical X'Pert instrument.

Electrochemical Characterization of NiFe/NF

All electrochemical measurements were carried out with a CHI 760 electrochemical workstation. As-prepared NiFe/GC or NiFe/NF were used directly as the working electrode without further treatments. The electrochemical performances of the oxygen electrodes were evaluated in a home-made three-electrode electrochemical cell using a Pt wire and a Ag/AgCl (3 M KCl) as the counter and the reference electrode, respectively. All potentials measured were calibrated to reversible hydrogen electrode (RHE) using the following equation: $E_{RHE} = E_{Ag/AgCl} + 0.197 \text{ V} + 0.059 \times pH$. OER polarization curves were recorded at a scan rate of 5 mV s$^{-1}$. Unless specifically mentioned, the curves were recorded without iR compensation. Before recording, NiFe/NF was cycled several times in KOH solutions until a stable cyclic voltammgram was recorded (normally the CV will stabilize within 5 cycles). Tafel slopes were derived from OER polarization curves obtained at 0.1 mV s$^{-1}$ and 95% iR compensation in all the three KOH solutions using NiFe/NF as the working electrode.

Chronopotentiometric and chronoamperometric measurements were obtained under the same experimental setup without compensating iR drop. The $R_x$ value of each solution was determined automatically by the potentiostat.

Electrochemical Quartz Crystal Microbalance measurements of NiFe/NF

EQCM measurements were performed on a CHI 440C Time-Resolved EQCM (CH Instruments) with a three-electrode configuration. An AT-cut platinum coated quartz crystal of 7.995 MHz resonance frequency with the geometrical area of 0.196 cm$^2$ was used as the substrate with platinum wire and Ag/AgCl (3 M KCl) as respective counter and reference electrodes. An aqueous solution containing 3 mM of $Ni(NO_3)_2 \cdot 6H_2O$ and 3 mM of $Fe(NO_3)_3 \cdot 9H_2O$ was used as the electrolyte. The electrodeposition was performed at 10° C. in potentiostatic mode at −1.0 V vs Ag/AgCl for 300 s and the corresponding change in resonance frequency measured. The change in mass per unit area, Δm, was calculated from the changes in resonance frequency, Δf, using the Sauerbrey equation[34]: $\Delta f = -2f_o^2 \Delta m/[A \sqrt{\mu\rho}]$, where $f_o$ is the resonant frequency of the quartz resonator, A is the area of the platinum coated onto the crystal, μ is the shear modulus of the quartz ($2.947 \times 10^{11}$ g cm$^{-1}$ s$^{-2}$), and ρ is density of the quartz (2.648 g cm$^{-3}$).

Calculation of Turnover Frequency of NiFe/NF

The TOF values of NiFe and Ir/C coated on GC electrodes were calculated according to equation[7, 35]: TOF=j×A/(4×F×m), where j is the current density obtained at overpotential of 400 mV in A cm$^{-2}$, A is the surface area of the GC electrode (0.07 cm$^{-2}$), F is the Faraday efficiency (96485 C mol$^{-1}$), and m is the number of moles of the Ni and Ir deposited onto the GC electrodes.

NiFe Composites on Glassy Carbon (GC) and Platinum (Pt) Electrodes

Initially, NiFe composites were deposited onto the surface of glassy carbon (GC) and platinum (Pt) electrodes for mechanistic studies. The electrodeposition was undertaken in the electrolyte containing equal molar of nickel (II) and iron (III) nitrates. The deposition potential was controlled at −1.0 V vs. Ag/AgCl to reduce NO$_3^-$ ions at the electrode surface to generate hydroxide ions, and increase the pH value (eq 1). Ni$^{2+}$ and Fe$^{3+}$ ions then reacted with these hydroxide ions to form bimetallic hydroxide deposits on the surface of electrodes according to eq 2.

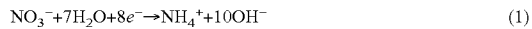

$$NO_3^- + 7H_2O + 8e^- \rightarrow NH_4^+ + 10OH^- \quad (1)$$

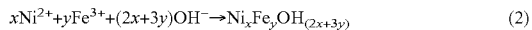

$$xNi^{2+} + yFe^{3+} + (2x+3y)OH^- \rightarrow Ni_xFe_yOH_{(2x+3y)} \quad (2)$$

The composition of the NiFe composites deposited was determined by X-ray photoelectron spectroscopy (XPS).

As displayed in FIG. 1a, Ni, Fe as well as O are detected in the XPS spectrum, suggesting a bimetallic metal composite is obtained. The Ni 2p spectrum (FIG. 1b) can be fitted into two spin-orbit peaks, namely Ni $2p_{1/2}$ and Ni $2p_{3/2}$ at 874 eV and 856 eV, with two shakeup satellites, indicating the Ni is in Ni$^{2+}$ oxidation state. FIG. 1c exhibits the high resolution Fe 2p spectrum. The observation of Fe $2p_{1/2}$ and Fe $2p_{3/2}$ at ~725 eV and ~712 eV with a shakeup satellite at ~720 eV confirms that Fe is mostly in Fe$^{3+}$ oxidation state in the NiFe composite. The atomic ratio of Ni and Fe in the composite deposited is determined to be 3 by taking average of the XPS results obtained on the NiFe coated Pt electrode at four different points. Hence, the NiFe composite obtained can be specified as Ni$_3$Fe(OH)$_9$. Besides that, the amount of catalyst deposited is 32 μg cm$^{-2}$ as determined by the electrochemical quartz crystal microbalance (EQCM, see details in Methods) technique.

Figure 2A:
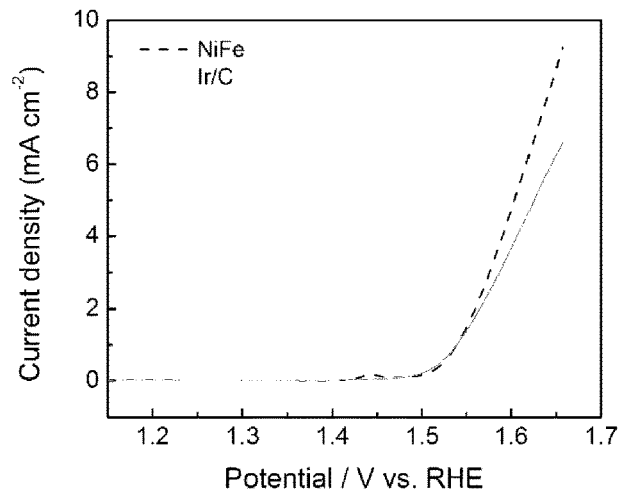
FIG. 2 at a, shows the first OER polarization curves obtained with NiFe and Ir/C coated GC electrodes in 0.1 M KOH solution, respectively whilst at b, shows the first, second, and third OER polarization curves obtained with the NiFe/GC electrode in 0.1 M KOH solution; and at c shows five consecutive polarization scans obtained with the NiFe/NF electrode, where all measurements were carried out at a scan rate of 5 mV s$^{-1}$.

FIG. 2a depicts the first OER polarization curves obtained with NiFe deposited and Ir/C (20 wt % of Ir, Premetek Co.) coated GC electrodes in 0.1 M KOH solution, respectively. Although having an identical onset OER potential, NiFe exhibits obviously higher catalytic activity compared with the benchmark Ir/C catalyst. At the overpotential of 400 mV, the current density obtained with NiFe is ~30% higher than the Ir/C. The intrinsic OER catalytic activities of NiFe and Ir/C are evaluated by calculating the turnover frequency (TOF) assuming all the Ni and Ir sites are involved in OER. The TOF associated with NiFe at the overpotential of 400 mV is 0.075 s$^{-1}$, which is also significantly higher than that obtained with Ir/C (0.027 s$^{-1}$). These collective data confirm that the as-deposited NiFe is highly efficient towards OER.

Figure 2B:
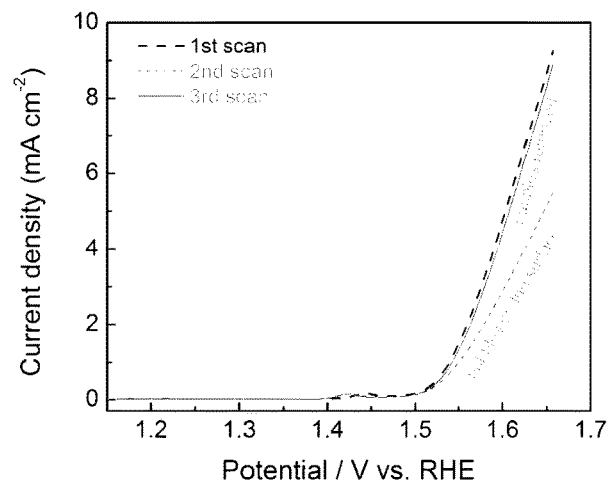
Figure 2C:
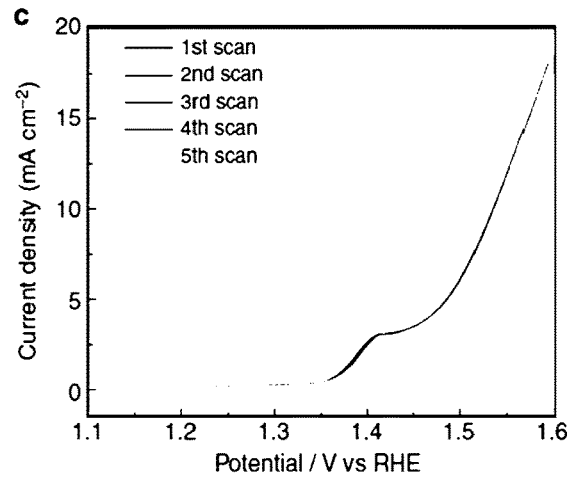
Figure 14:
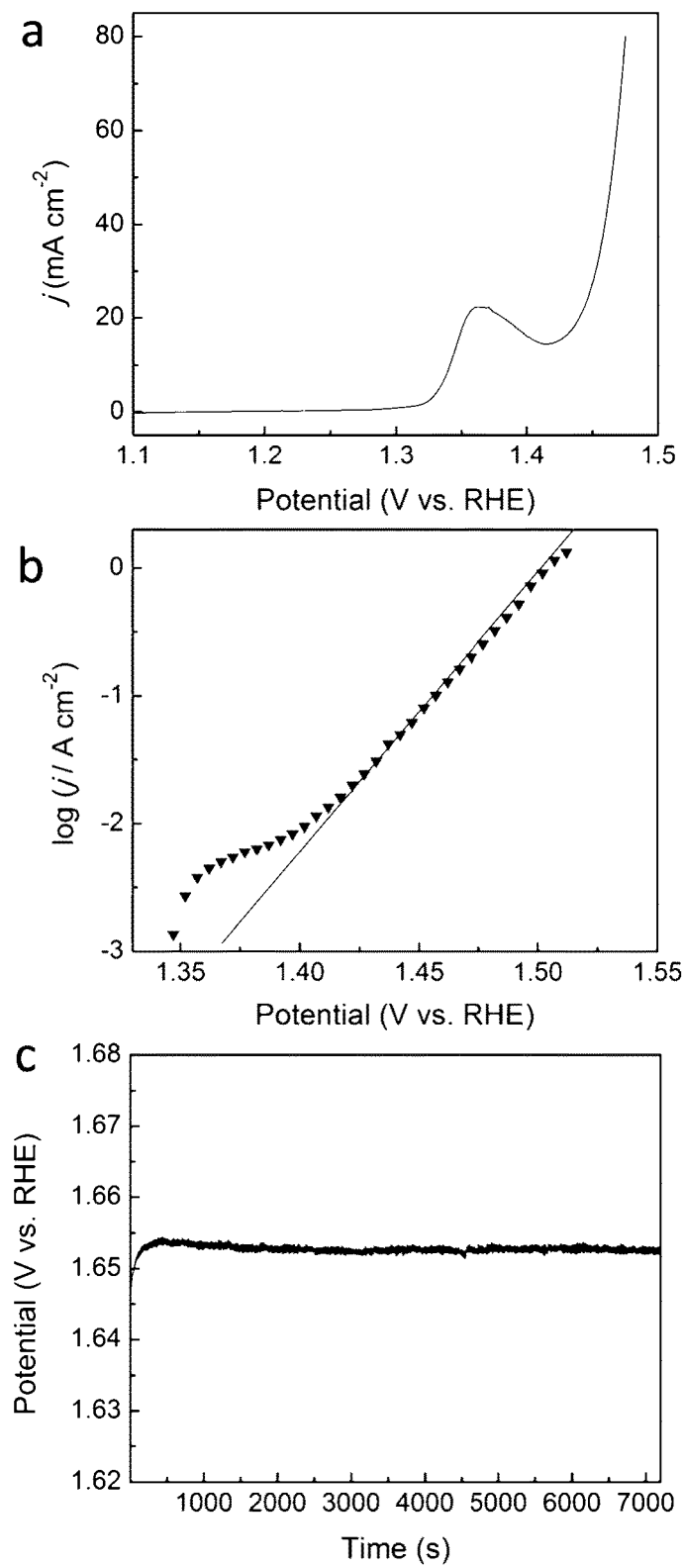
FIG. 14 shows the electrochemical performances of NiFe/NF in 10 M KOH, where: a shows the OER polarization curve of NiFe/NF in 10 M KOH at 5 mV cm$^{-1}$ with 75% iR compensation; b shows the Tafel plot of NiFe/NF in 10 M KOH at 0.1 mV s$^{-1}$ with 95% iR compensation; and c shows the chronopotentiometry curve of NiFe/NF in 10 M KOH with a constant current density of 500 mA cm$^{-2}$.

FIG. 2b displays the first three OER polarization curves obtained with the NiFe/GC electrode in 0.1 M KOH solution. The oxygen bubbles generated during the first scan tend to accumulate on surface of the planar GC electrode, blocking the active NiFe sites and impeding the ionic transport. As a consequence, the second LSV scan exhibits a severely receded OER performance. Only when the bubbles attached on NiFe/GC electrode are carefully removed by thorough water rinsing and subsequent nitrogen blowing, can the catalytic activity of the NiFe/GC electrode be recovered (3rd scan, FIG. 2b). In contrast, five consequent OER polarization curves obtained with the 3D NiFe/NF electrode under the same conditions exhibit almost no decrease in OER activity (FIG. 2c) suggesting very minor impact of gas bubble on the performance. This is also confirmed in high current density (100 mA cm$^{-2}$) bulk water electrolysis (10 h), where no gas accumulation on the electrode surface and no voltage drop are observed (FIG. 14c). The superior gas dissipation ability can possibly be arisen from two levels: the interconnected NiFe nanosheets form hierarchical pores (~50-100 nm), which is known to improve the wetting properties of the electrode surface and facilitates the detachment of bubbles; (ii) the macroporous NF (pore size ranges from 100 to 200 μm) enables a fast dissipation of the large oxygen bubbles into the electrolyte. All these features contribute to the highly diffusive NiFe/NF gas anode.

NiFe Composites on Nickel Foam (NF)

Figure 3:
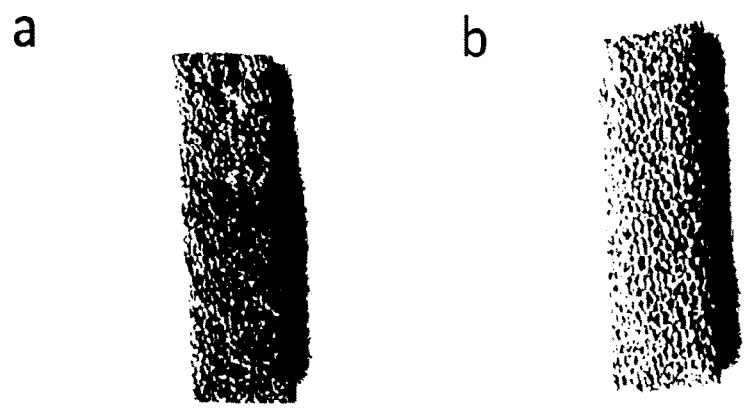
FIG. 3 shows a photograph of (a) the NiFe/NF electrode and (b) the NF substrate.
Figure 4:
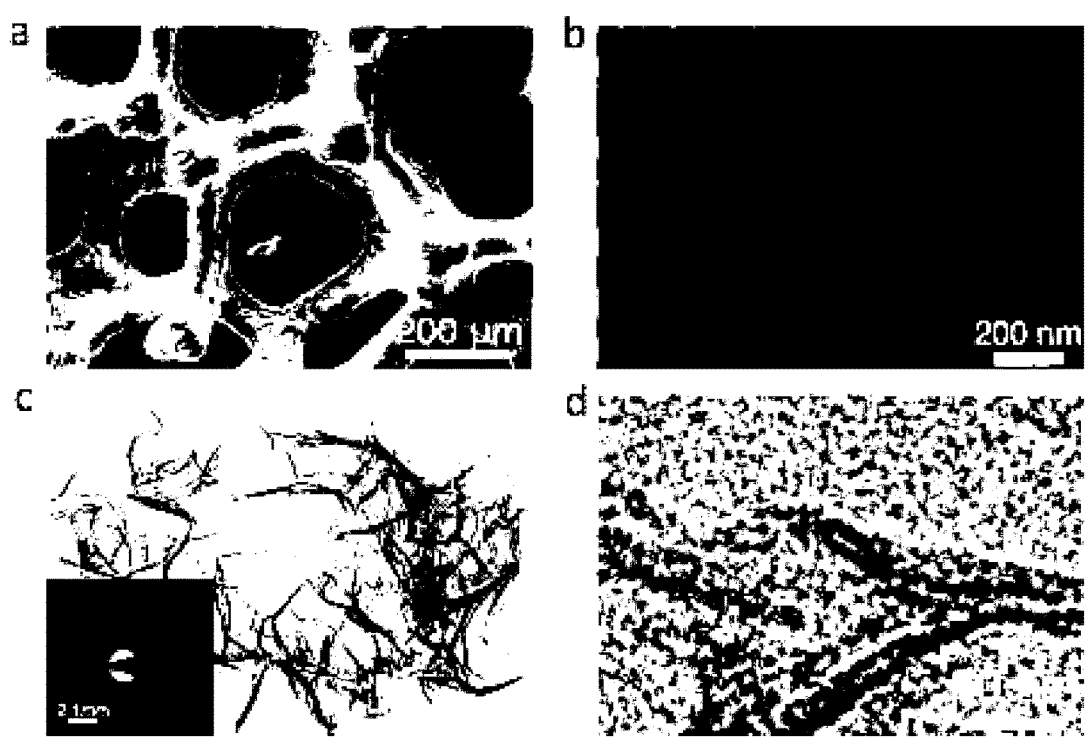
FIG. 4 at a and b, show SEM images of NiFe deposited on nickel foam (NF), whilst at c and d, show TEM images of NiFe nanosheets scratched off from the NiFe/NF (the inset shows the corresponding selected area diffraction pattern).
Figure 5:
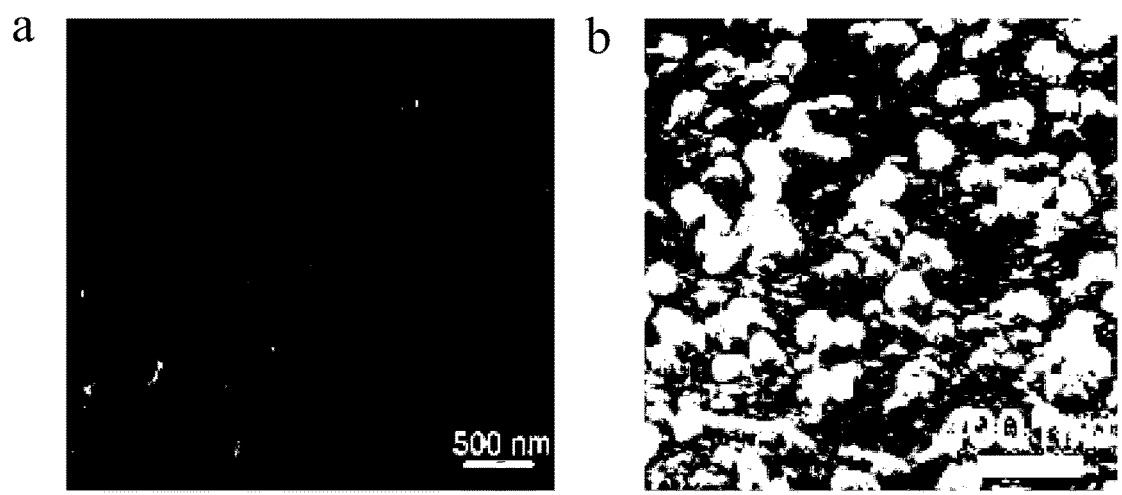
FIG. 5 shows SEM images of (a) iron and (b) nickel deposited on the surface of nickel foam.

NiFe/NF was obtained according to the same method to prepare NiFe/GC. The electrodeposition process leads to a brown thin film deposited onto the NF substrate, as shown for example in FIG. 3. FIG. 4a shows the SEM image of NiFe/NF. The NiFe composites are found to deposit onto the macroscopic 3D skeleton of NF. Unlike 2D planar substrates, the 3D structure and high porosity of NF enable a high catalyst loading without sacrificing the amount of accessible active sites. FIG. 4b displays a high resolution SEM image of the NiFe/NF composite. The NiFe deposit shows a highly rippled nanosheet structure, which is obviously different from morphologies that can be obtained when Fe and Ni are deposited individually onto NF (FIG. 5). The nanosheets are generally planar (although rippled) and the metallic composites comprising the nanosheets have a thickness of generally around 10 nm. The lateral extension of the nanosheets range from 50 nm to several hundred nanometers. The rippled nanosheets are interconnected forming porous NiFe nanostructure, with an average pore diameter of around 50 nm. The above observations suggest the as-prepared NiFe/NF electrode has hierarchical porous structures i.e. the average pore diameter of the NF substrate is much larger than that of the NiFe layer (i.e. the porous metallic composite), a configuration that is beneficial for electrocatalytic gas evolution.

FIGS. 4c and 4d are TEM images of NiFe composites carefully scratched off from the NF substrate. The NiFe nanosheets show a rippled sheet structure with a dimension around 300 nm, in accordance to the SEM images. The nanosheets are transparent, indicating they are ultrathin. High resolution TEM suggests as-prepared NiFe nanosheets are amorphous, without the observation of typical lattice fringes for Ni, Fe or NiFe composites. The inset of FIG. 4c is the selected-area electron diffraction (SAED) pattern of the nanosheet. The pattern shows a broad and diffused halo ring, further confirming the as-prepared NiFe nanosheets are amorphous.

Figure 6:
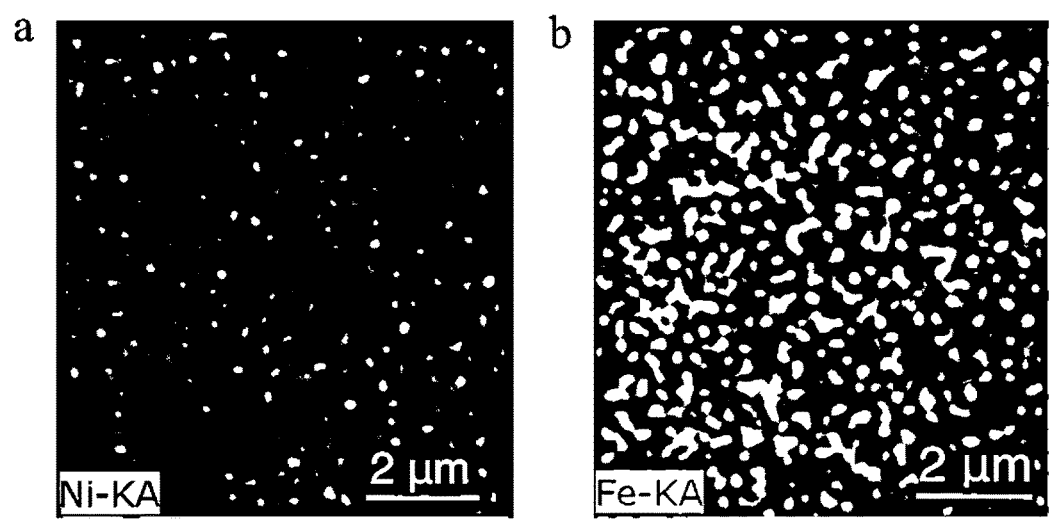
FIG. 6 shows EDX mapping of NiFe/NF obtained with SEM, (a) nickel and (b) iron.
Figure 7A:
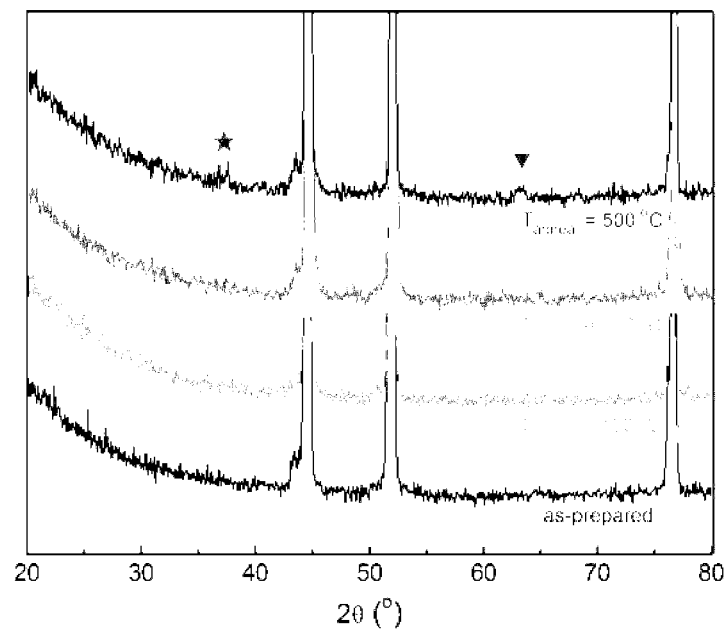
FIG. 7a shows XRD patterns of as-prepared and annealed NiFe/NF samples. The pentagram and triangle represent the Bragg reflections for hematite, whilst
Figure 7B:
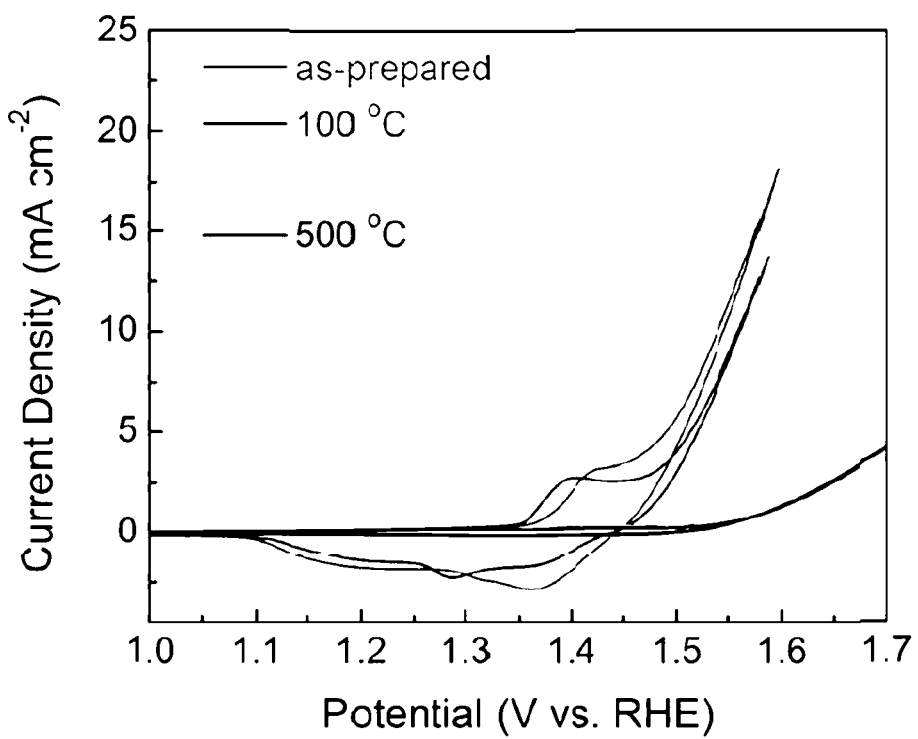
FIG. 7b shows cyclic voltammograms (CVs) obtained with different annealing temperatures. The CVs were recorded in a 0.1 M KOH solution at a scan rate of 5 mVs$^{-1}$.

FIG. 6 shows the elements distributions of Ni and Fe in the NiFe/NF composite detected by energy-dispersive X-ray spectroscopy (EDX). Both Ni and Fe are found to distribute uniformly in the whole area tested, confirming the successful deposition of NiFe bimetallic composites on the NF substrate. The XRD pattern shown in FIG. 7a exhibits the three diffraction peaks of the NF at 44.5°, 51.8° and 76.4°, respectively, without the detection of any new diffraction peaks, further confirming the NiFe deposited onto NF is amorphous in nature. Post-annealing treatment will endow NiFe/NF crystallinity. Also shown in FIG. 7a, at the annealing temperature ($T_{anneal}$) higher than 500° C., new diffraction peaks at 36.5° and 63.5° are emerged, ascribed to the crystalline hematite structure. However, as described below, the OER catalytic activity of NiFe/NF decreases accordingly with the increased $T_{anneal}$ (refer FIG. 7b), further indicating the benefits of utilizing amorphous structures for OER.

Electrochemical Performances of NiFe Composites on Nickel Foam (NE) for OER

Figure 8:
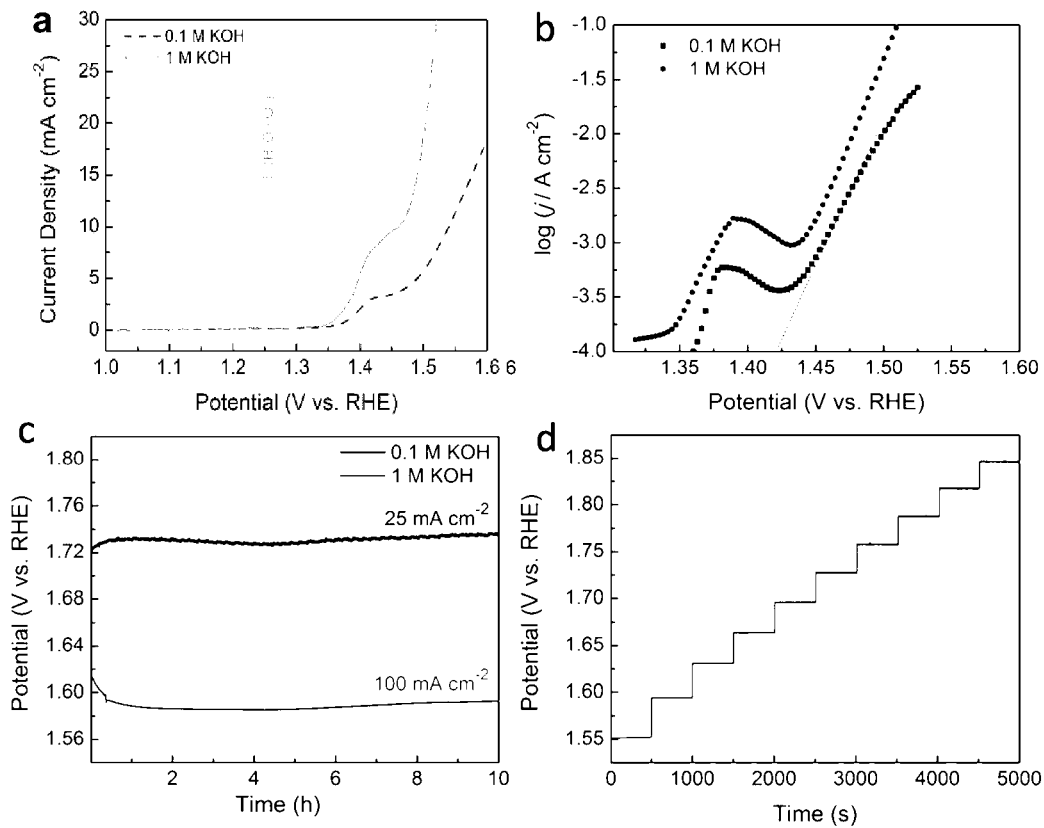
FIG. 8 shows the electrochemical characterisations of an embodiment of the invention with the as-prepared NiFe/NF oxygen electrode where: a shows OER polarization curves of the NiFe/NF oxygen electrode in 0.1 and 1 M KOH solutions at 5 mV s$^{-1}$ with 95% iR-compensations; b shows Tafel plots of the NiFe/NF oxygen electrode in 0.1 and 1 M KOH at 0.1 mV s$^{-1}$ with 95% iR compensation; c shows chronopotentiometric curves obtained with the NiFe/NF oxygen electrode in 0.1 and 1 M KOH, with constant current densities of 25 and 100 mA cm$^{-2}$, respectively; and d shows multi-current process obtained with the NiFe/NF oxygen electrode in 1 M KOH. The current density started at 50 mA cm$^{-2}$ and finished at 500 mA cm$^2$, with an increment of 50 mA cm$^{-2}$ every 500 s.
Figure 9:
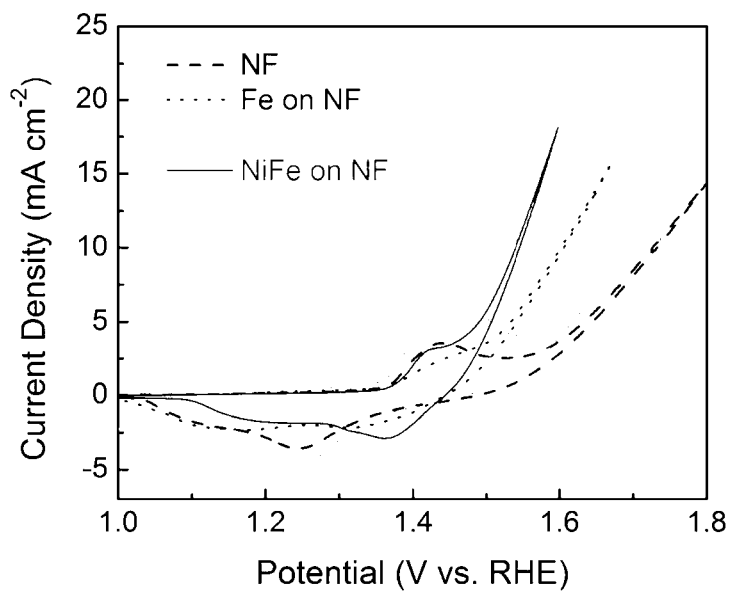
FIG. 9 shows comparisons of OER activity of pure NF, Fe/NF, Ni/NF and NiFe/NF in 0.1 M KOH at 5 mV s$^{-1}$.
Figure 10:
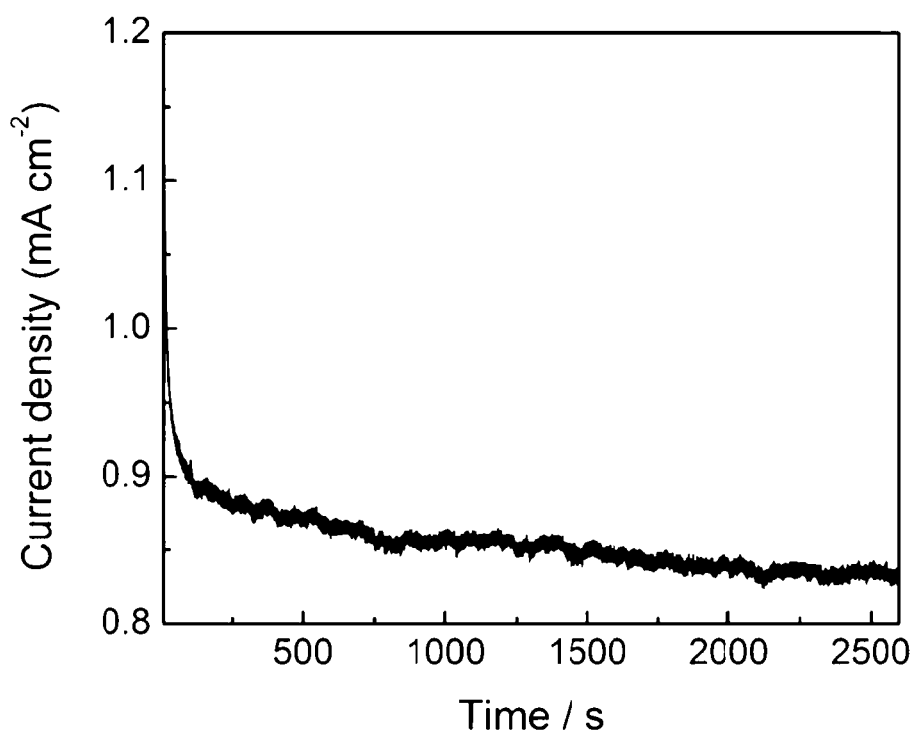
FIG. 10 shows the chronoamperometric curve obtained with pure NF substrate in 1 M KOH at 1.48 V vs. RHE.

The electrocatalytic performances of the NiFe/NF electrode for OER in alkaline media are shown in FIG. 8. A small oxidation process is detected at 1.41 V vs. RHE, corresponding to the formation of Ni (III) or Ni (IV) species. The OER process of the NiFe/NF electrode in 1 M KOH exhibits an onset potential of 1.44 V, similar to that in 0.1 M KOH. However, the current increases more rapidly in 1 M KOH that in 0.1 M KOH. At the same overpotential ($\eta$)=270 mV, in 0.1 M KOH, j=20 mA cm$^{-2}$ is obtained, while j=80 mA cm$^{-2}$ is obtained in 1 M KOH solution. The high catalytic activity of NiFe/NF is mainly attributed to the NiFe nanosheets deposited on NF. As a comparison, the current obtained from the NF substrate is significantly lower at the same applied potential (FIG. 9). Besides that, Ni and Fe alone deposited on the NF substrates are much inferior in catalyzing the OER compared with the NiFe composites (FIG. 9) in alkaline solutions, further confirming the high catalytic activity originated from the NiFe composites. Moreover, the OER performances of the NiFe/NF is evaluated by Tafel equation $\eta$=b log (j/j$_0$), where b is the Tafel slope, and j$_0$ is the exchange current density. Shown in FIG. 8b, the slopes remain linear even at high values of j, indicating fast electron and mass transfers between the catalyst and the electrolyte. The Tafel slope of NiFe/NF in 0.1 M and 1 M KOH are 33 and 28 mV dec$^{-1}$, respectively. These values are even lower than the benchmark IrO$_2$ and RuO$_2$ catalysts, indicating a better OER catalytic activity obtained with the as-prepared NiFe/NF oxygen electrode, since lower Tafel slopes represents faster OER reaction kinetics.

FIG. 8d represents a multi-step chronopotentiometric curve obtained at NiFe/NF in 1 M KOH. In the experiment, the current is increased from 50 mA cm$^{-2}$ to 500 mA cm$^{-2}$ with an increment of 50 mA cm$^{-2}$ per 500 seconds, and the corresponding changes of potential are recorded. At the start of 50 mA cm$^{-2}$, the potential immediately levels off at 1.55 V, and remains constant for the rest 500 s. Similar results are obtained for all current densities tested herein, even at 500 mA cm$^{-2}$. These chronopotentiometric responses reflect the excellent mass transport properties (water diffusing in and oxygen bubbles diffusing out), conductivity and mechanical robustness of the NiFe/NF electrode.

Figure 11:
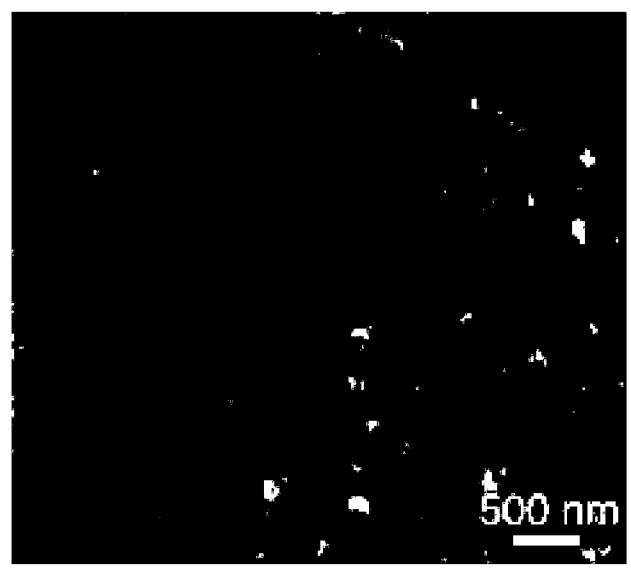
FIG. 11 shows SEM images of NiFe/NF after long-term of water electrolysis (>100 h).

The electrochemical stability of the NiFe/NF electrode in OER is displayed in Figure In 0.1 M KOH, the potential required to deliver a j of 25 mA cm$^{-2}$ is ~1.73 V, and then stabilizes around this value during the 10 h reaction session, with very small voltage fluctuations (<10 mV). The NiFe/NF electrode works more efficiently in 1 M KOH. The potential required to deliver a j of 100 mA cm$^{-2}$ is ~1.60 V, with no significant changes detected during the 10 h electrolysis. In contrast, the OER catalytic activity of NF substrate alone decays gradually in prolonged bulk water electrolysis (see Figure due to surface passivation by the formation of NiO$_x$ layers. Vigorous bubble evolution is observed during the water electrolysis, which dissipates rapidly into the solution, with no bubble accumulation detected on the electrode surface. This could be ascribed to the macroscopic 3D structure of the NF substrate, which facilitates the gas diffusion and also minimizes the possible peeling off of the NiFe catalysts from the NF substrate as a result of mechanical stress. In contrast, the OER catalytic activity of NF alone decays gradually in prolonged bulk water electrolysis, due to the surface passivation by the formation NiO$_x$ layers. The outstanding physical stability of NiFe/NF is also confirmed by SEM. FIG. 11 shows the high resolution SEM image of NiFe/NF after >100 h of bulk water electrolysis. Shown in the image, the porous morphology of the NiFe nanosheets is well-preserved, and no detachment or dissolution of the catalyst from the NF substrate is observed.

The performance of NiFe/NF is also compared with other state-of-the-art electrocatalysts in alkaline media. Table 1 summarizes the overpotentials required to deliver a j of 10 mA cm$^{-2}$, a value relative to solar fuel synthesis because this current density roughly matches the spectrum for a 10% efficient solar-to-fuel device.

TABLE 1

OER activities of some benchmark electrocatalysts in alkaline solutions with a current density of 10 mA cm$^{-2}$

| Materials | Electrolyte | $\eta$/mV | Reference |
|---|---|---|---|
| NiFe/NF | 0.1M KOH | 240 | Described herein |
| NiFe/NF | 1M KOH | 215 | Described herein* |
| Co$_3$O$_4$ | 1M KOH | 328 | Esswein et al. |
| Co$_3$O$_4$/Graphene | 1M KOH | 310 | Liang et al. |
| Ni$_{0.9}$Fe$_{0.1}$O$_x$ | 1M KOH | 336 | Trotochaud et al |
| 20 wt % Ir/C | 0.1M KOH | 380 | Gorlin et al |
| 20 wt % Ru/C | 0.1M KOH | 390 | Gorlin et al |
| Mn oxide | 0.1M KOH | 540 | Gorlin et al |
| Mn$_3$O$_4$/CoSe$_2$ | 0.1M KOH | 450 | Gao et al |
| NiFe-LDH/CNT | 0.1M KOH | 308 | Gong et al |
| NiFe-LDH/CNT | 1M KOH | 247 | Gong et al |
| BSCF[a] | 0.1M KOH | 400 | Suntivich et al |

*Measured by Tafel plot.
[a]The current density is 20 mA cm$^{-2}$.

In Table 1, the values of the electrocatalysts in alkaline media of the present invention are compared with that of Co$_3$O$_4$ [Esswein A J, McMurdo M J, Ross P N, Bell A T, Tilley T D. Size-Dependent Activity of Co$_3$O$_4$ Nanoparticle Anodes for Alkaline Water Electrolysis. *J Phys Chem C* 2009, 113(33): 15068-15072], Co$_3$O$_4$/Graphene [Liang Y Y, Li Y G, Wang H L, Zhou J G, Wang J, Regier T, et al. Co3O4 nanocrystals on graphene as a synergistic catalyst for oxygen reduction reaction. *Nat Mater* 2011, 10(10): 780-786], Ni$_{0.9}$Fe$_{0.1}$O$_x$ [Trotochaud L, Ranney J K, Williams K N, Boettcher Solution-Cast Metal Oxide Thin Film Electrocatalysts for Oxygen Evolution. *J Am Chem Soc* 2012, 134(41): 17253-17261], 20 wt % Ir/C, 20 wt % Ru/C and Mn oxide [Gorlin Y, Jaramillo T F. A Bifunctional Nonprecious Metal Catalyst for Oxygen Reduction and Water Oxidation. *J Am Chem Soc* 2010, 132(39): 13612-13614], Mn$_3$O$_4$/CoSe$_2$ [Gao M R, Xu Y F, Jiang J, Zheng Y R, Yu S H. Water Oxidation Electrocatalyzed by an Efficient Mn3O4/CoSe2 Nanocomposite. *J Am Chem Soc* 2012, 134(6): 2930-2933], NiFe-LDH/CNT and NiFe-LDH/CNT [Gong M, Li Y G, Wang Liang Y Y, Wu J Z, Zhou J G, et al. An Advanced Ni—Fe Layered Double Hydroxide Electrocatalyst for Water Oxidation. *J Am Chem Soc* 2013, 135(23): 8452-

8455], and BSCF [Suntivich J, May K J, Gasteiger H A, Goodenough J B, Shao-Horn Y. A Perovskite Oxide Optimized for Oxygen Evolution Catalysis from Molecular Orbital Principles. *Science* 2011, 334(6061): 1383-1385].

Figure 12:
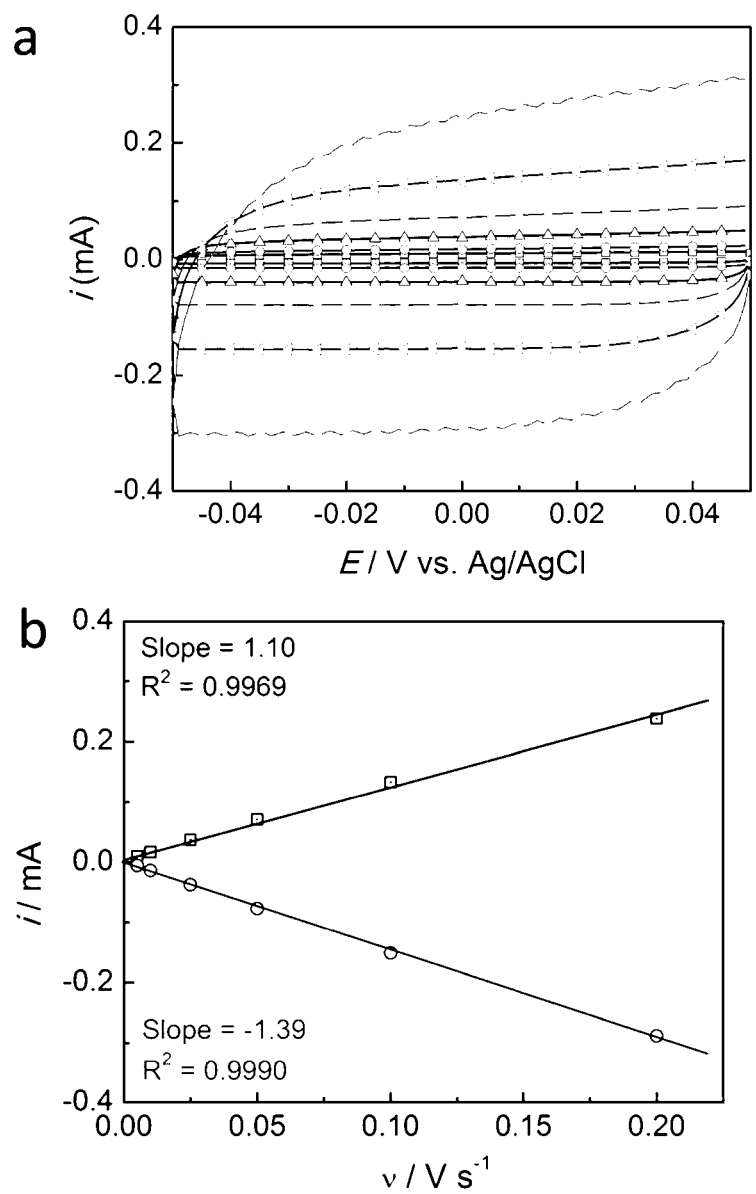
FIG. 12 shows: at a charging currents measured in the non-Faradaic potential range of −0.05 V to 0.05V at scan rates of 5, 10, 25, 50, 100, and 200 mV s$^{-1}$, respectively; and at b the cathodic (circle) and anodic (square) charging currents measured at 0 V vs Ag/AgCl, plotted against the scan rates. The double-layer capacitance determined from this system is taken by the average of the absolute value of anodic and cathodic slopes of the linear fits.

The overpotential obtained with NiFe/NF is the lowest among all the electrocatalysts, even outperforming the benchmark Ir/C and Ru/C electrocatalysts. Furthermore, the superior OER catalytic activity of NiFe/NF is evaluated by using both the electrochemical surface area (ECAS) and geometric surface area (GSA). The ECAS is calculated based on the method established previously and the results are shown in FIG. 12.

Briefly, a potential range where no apparent Faradaic process happened was firstly determined using the static CV. The charging current $i_c$ was measured from the CVs at different scan rates, as shown in FIG. 12a. The relation between $i_c$, the scan rate (v) and the double layer capacitance ($C_{DL}$) was given in eq 1.

$$i_c = vCDL \quad (1)$$

Therefore, the slope of $i_c$ as a function of v will give a straight line with the slope equal to $C_{DL}$ (FIG. 12b). The $C_{DL}$ of NiFe/NF measured from the scan rate dependent CVs is 1.10 mF.

For the estimation of ECAS, a specific capacitance ($C_s$) value $C_s=0.040$ mF cm$^{-2}$ in 1 M NaOH is adopted from previous reports. As a result, the ECAS of the NiFe/NF is calculated to be 27.5 cm$^2$ according to eq 2.

$$ECAS = \frac{CDL}{Cs} \quad (2)$$

The geometric surface area (GSA) of the NiFe/NF electrode is 0.55 cm2, therefore the roughness factor (RF) of as-prepared NiFe/NF electrode is 50 as determined by eq 3.

$$RF = \frac{ECAS}{GSA} \quad (3)$$

A roughness factor (RF) of 50 is obtained with the NiFe/NF electrode. Therefore, the current density based on ECSA ($j_{ECAS}$) is simply calculated by dividing the current density obtained with GSA ($j_{GSA}$) by the RF. Shown in Table 2, even at a lower overpotential of 300 mV, NiFe/NF exhibits a significantly higher catalytic activity compared with $IrO_x$, $NiCoO_x$ and $NiFeO_x$, as exemplified by much higher current densities. Collectively, the data suggest that the as-prepared NiFe/NF is the most active OER electrocatalysts in alkaline electrolytes reported so far.

TABLE 2

Comparison of OER activities of NiFe/NF electrode with other reported catalysts using both GSA and ECAS in 1M alkaline solutions.

| Materials | $j_{GSA}$/mA cm$^2$ | $j_{ECAS}$/mA cm$^2$ | η/mV | Reference |
|---|---|---|---|---|
| NiFe/NF | 300 | 6 | 300 | This work |
| $IrO_x$ | 42 | 0.4 | 350 | McCrory et al |
| $NiCoO_x$ | 6 | 0.2 | 350 | McCrory et al |
| $NiFeO_x$ | 15 | 3 | 350 | McCrory et al |

McCrory C C L, Jung S, Peters J C, Jaramillo T F. Benchmarking Heterogeneous Electrocatalysts for the Oxygen Evolution Reaction. *J Am Chem Soc* 2013, 135: 11.

Figure 13A:
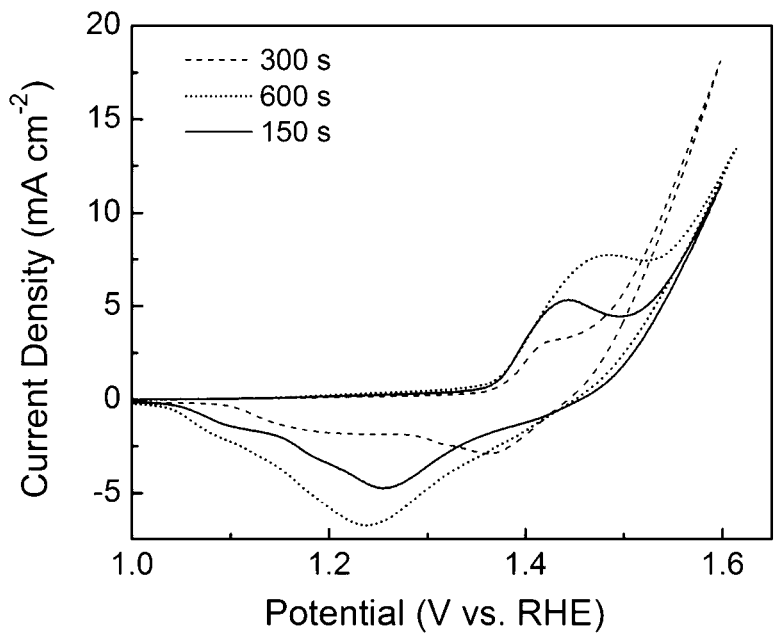
FIG. 13a shows CVs of NiFe/NF in 0.1 M KOH at 5 mV s-1 prepared from 150, 300, and 600 s of electrodeposition, respectively.
Figure 13B:
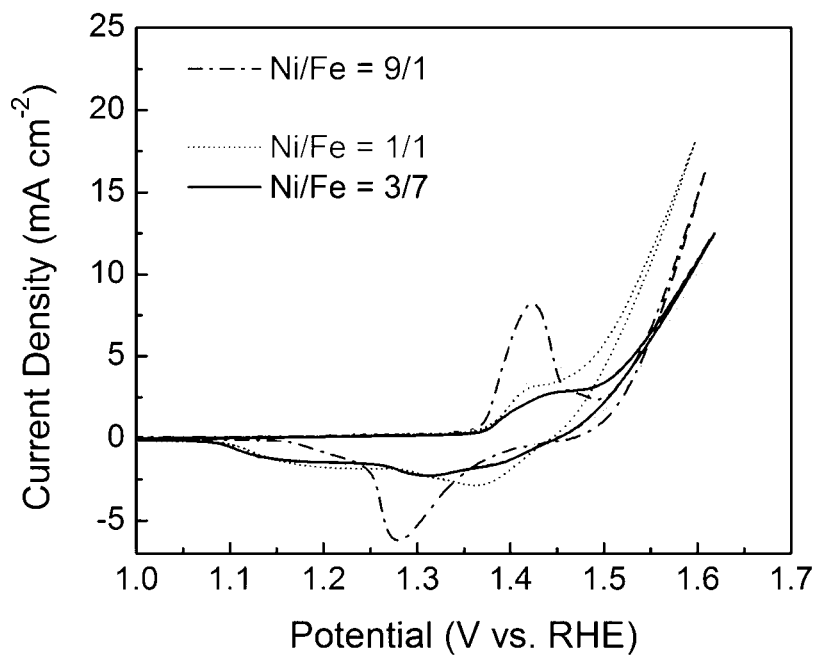
FIG. 13b shows CVs obtained with NiFe/NF prepared from electrolytes containing different molar ratios of nickel nitrate and iron nitrate in 0.1 M KOH at 5 mV s$^{-1}$.

The one-step electrodeposition preparation of NiFe/NF is simple and straightforward, and can be easily realized in industry and scaled up to meet large-scale needs. The optimized deposition time of NiFe has been determined to be 300 s. Shown in FIG. 13a, short deposition time results in insufficient active sites, while prolonged deposition time leads to thick composite films and can inhibit the charge transfer between NiFe and NF. Both factors can cause receded OER performance of the NiFe/NF electrode. Furthermore, the molar ratio between $Ni^{2+}$ and $Fe^{3+}$ in the deposition electrolytes is also optimised. Shown in FIG. 13b, a 1:1 molar ratio of $Ni^{2+}$ and $Fe^{3+}$ yields the NiFe/NF with the highest OER catalytic activity, while electrolytes containing higher molar concentration of either $Ni^{2+}$ or $Fe^{3+}$ result in significantly degraded OER performances of the corresponding NiFe/NF electrodes obtained.

The NiFe/NF electrode exhibits an increased OER catalytic activity in KOH solutions with higher concentrations, as described above. Hence, it can be concluded that the electrolytes play an important role in OER, and a more detailed study is described herein. That is, the molar ratios of the starting electrolytes in the electrolyte solution, plays an important role in the chemical composition and microstructure of the resulting NiFe composite layer. This in turn affects the OER catalytic performance of the final composite.

Figure 13C:
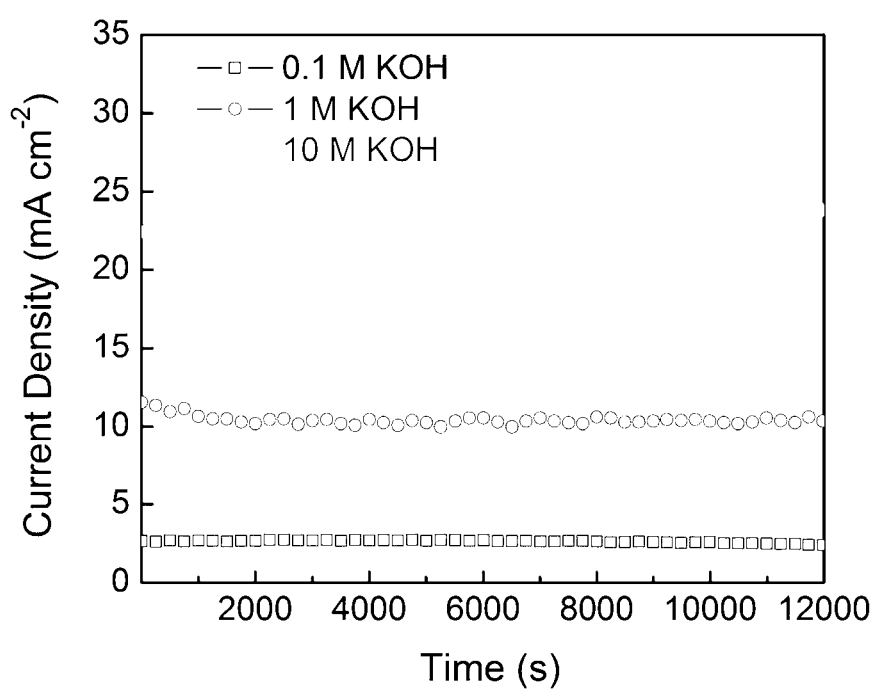
FIG. 13c shows chronoamperometric curves of the NiFe/NF electrode in 0.1, 1 and 10 M KOH with a constant overpotential of 250 mV.

FIG. 13c displays the current density-time curves obtained with the NiFe/NF electrode in 0.1, 1 and 10 M KOH solutions, respectively, at a fixed overpotential of 250 mV. In all three alkaline solutions, NiFe/NF exhibits prominent stability, and the catalytic activity increases accordingly with the increase of the KOH concentration, as exemplified by the current density growing from 2.5 mA cm$^{-2}$ in 0.1 M KOH to 23 mA cm$^{-2}$ in 10 M KOH. The higher activity at higher concentration is attributed to the significantly reduced solution resistance ($R_s$), which decreases from 26Ω in 0.1 M KOH to less than 1Ω in 10 M KOH. The very low $R_s$ in the 10 M KOH reduces the energy loss during bulk water electrolysis at high current, therefore increases the overall energy efficiency.

The catalytic performances of the NiFe/NF electrode in 10 M KOH are further investigated in more details. FIG. 14a represents the OER polarization curve of NiFe/NF in 10 M KOH. The OER starts at an onset potential of 1.41 V, and a j=80 mA cm$^{-2}$ obtained at 1.47 V, 60 and 30 mV lower than that obtained in 0.1 and 1 M KOH, respectively. The Tafel plot (FIG. 14b) exhibits excellent linearity, even at j as high as 1000 mA cm$^{-2}$, attributed to the high conductivity of the supporting NF substrates as well as the low value of $R_s$. The overpotentials at j of 500 and 1000 mA cm$^{-2}$, are merely 240 and 270 mV, respectively, according to the Tafel plot. These results faithfully satisfy the requirements for commercial water electrolyzers (j≥500 mA cm$^{-2}$ at η≤300 mV). Furthermore, the durability of NiFe/NF in 10 M KOH is also investigated at j of 500 mA cm$^{-2}$. The applied voltage exhibits a phenomenal stability during the whole session tested herein (FIG. 14c), further indicating the NiFe/NF electrode is very stable and can be used in the extremely corrosive alkaline electrolytes.

In the OER process, several energy barriers need to be overcome before the reaction can proceed, including the electrical resistance of the circuit, the activation energies of OER on the surface of electrodes, the availability of electrode surface due to the coverage of oxygen bubbles during reaction and the resistance within electrolytes which impedes the ionic transfer. To improve the energy efficiency of OER, these energy barriers require to be minimized by the way of rational design of electrocatalysts and careful selection of electrolytes, which are discussed as follows.

(i) Electrical Resistance of Circuit:

The electrical resistance of circuit can be divided into two categories, namely the resistance from setup including the wiring and connections and the resistance from the contact between OER catalysts and the supporting electrodes. The former one is usually regarded as insignificant in OER thusly can be ignored, while the latter is the main source of resistance. Herein, the resistance arisen from the contact between catalysts and substrates is addressed via the binder-free electrodeposition. The typical addition of polymeric binders tends to impede the charge transport during catalytic reactions, while the electrodeposited NiFe composites bind firmly on the skeleton of NF in the absence of any polymeric binders, ensuring a good electrical contact. Furthermore, the substrate employed herein, NF, is highly conductive, which further facilitates the electron transport during OER and reduces the electrical resistance.

(ii) Activation Energies of OER:

The overpotentials associated with OER are intrinsically interrelated with its activation energies. Higher activation energies tend to result in higher overpotentials therefore leads to low energy efficiencies. The activation energies of OER can be lowered by electrocatalysts. The NiFe composite obtained in this study is an intrinsically more active catalysts compared with the bench mark Ir/C. Moreover, Herein, the overpotential required to initiate the OER process is merely ~200 mV in alkaline electrolytes associated with the NiFe/NF electrode, which is the smallest among non-precious metal based catalysts, indicating significantly diminished OER activation energies.

(iii) Bubble Overpotentials:

The attachment of bubbles on the surface of electrodes during OER can block the active sites of the catalysts and prohibits ionic transportation, therefore leads to voltage drop, which will be further aggravated under high current densities. Moreover, the effect of bubbles is worse for higher catalytic activity electrodes as more bubbles will generate owing to the faster reaction kinetics. As a consequence, the bubble overpotential issue needs to be addressed for achieving high energy efficiencies in OER. The porous structures of the NiFe/NF electrode prepared herein are beneficial for the removal of bubbles generated during OER. On the one hand, the interconnected NiFe nanosheets form hierarchical pores (~50-100 nm), which is known to improve the wetting properties of the electrode surface, therefore facilitates the removal of bubbles attached. On the other hand, the porous NF (having pore size ranges from 100 to 200 μm) enables a fast dissipation of the large oxygen bubbles into the electrolyte, especially under high current densities, rather than accumulating inside the foam. These features make NiFe/NF a stable electrode for OER, with no evidence of voltage drop observed during a 10 h bulk water electrolysis.

(iv) Resistance of Electrolytes:

The resistance from electrolytes results in a significant amount of energy loss, which is dissipated as heat. The higher the resistance of electrolyte, the more energy is wasted during OER. In this study, the resistance of electrolyte is reduced from 26Ω to less than 1Ω, simply by increasing the KOH concentration from 0.1 M to 10 M. Accordingly, the catalytic performance of NiFe/NF is enhanced substantially in KOH having higher concentrations.

The binder-free, electrodeposition approach produces firmly bonded NiFe composites on the highly conductive NF, which minimizes the resistance arisen from the contact between catalysts and NF substrates. The application of polymeric binders (for example, Nafion) for powder-based catalysts tends to impede the charge transport during catalytic reactions, and also deteriorate the mechanical stability of the catalysts under high current operation. Application of high concentration electrolytes provides further reduction of the whole cell resistance and overpotentials (FIG. 13c), provided that the catalysts remain stable, as is the case of NiFe/NF electrodes.

A highly efficient, freestanding oxygen evolution electrode is prepared via electrodeposition of porous amorphous NiFe hydroxide nanosheets onto macroporous NF substrates without using chemical binders. The as-prepared NiFe/NF electrode has hierarchical porosities, which offer large active surface area, fast mass transport and fast electron transport in the electrode. In alkaline electrolytes, NiFe/NF catalyses OER at very low overpotentials (~200 mV) with prominent durability under high current densities. The highest catalytic activity of NiFe/NF is obtained in 10 M KOH to deliver a j of 500 mA cm$^{-2}$ at an overpotential of 240 mV.

Example 2—Trimetallic Complex of NiCoFe on NF

Preparation of NiCoFe/NF

NF (thickness: 1.6 mm, bulk density: 0.45 g cm$^{-3}$, Goodfellow) was first sonicated in 5 M HCl solution for 20 min to remove the $NiO_x$ layer on the surface, rinsed subsequently with water and ethanol, and then dried in air. The electrodeposition was carried out in a standard three-electrode electrochemical cell. NF was used as the working electrode, together with a parallel positioned platinum plate auxiliary electrode and a Ag/AgCl (3 M KCl) reference electrode. To obtain trimetallic composites, Milliq water (~18.1 MΩ) dissolved with x mM $Ni(NO_3)_2 \cdot 6H_2O$, x mM $Co(NO_3)_3 \cdot 6H_2O$ and y mM $Fe(NO_3)_3 \cdot 9H_2O$ (2x+y=5) was used as the electrolyte. For NiCo bimetallic y=0. The electrodeposition was conducted with a CHI 760 Electrochemical Workstation (CH Instrument) at −1.0 V (vs. Ag/AgCl) for 300 s under ambient conditions. After deposition, the NF was carefully withdrawn from the electrolyte, rinsed thoroughly with water and ethanol, and left dry in air.

NiCoFe electrodeposited on Pt plate was obtained according to the same procedure for the preparation of NiCoFe/NF from the electrolyte containing equal molar of $Ni^{2+}$, $Co^{2+}$ and $Fe^{3+}$.

Physical Characterization of NiCoFe/NF

XPS was performed on a Thermo ESCALAB250i X-ray Photoelectron Spectrometer. SEM was carried out using a FEI Nova NanoSEM 230 with a 10 kV accelerating voltage. Raman spectroscopy was performed using a laser micro-Raman spectrometer (Renishaw) employing a laser with an incident wavelength of 514.5 nm. XRD was performed on a PANalytical X'Pert instrument. Time-of-Flight secondary ion mass spectrometry (TOF-SIMS) was performed on a TOF.SIMS 5 instrument.

Electrochemical Characterization of NiCoFe/NF

All electrochemical measurements were carried out with a CHI 760 electrochemical workstation in 1 M KOH solution (pH=14). NiCoFe/NF electrodeposited from electrolyte containing equal molar of $Ni^{2+}$, $Co^{2+}$ and $Fe^{3+}$ was used directly as the working electrode without further treatments. The electrochemical characterizations were conducted in a standard three-electrode electrochemical cell employing a Pt wire and a Ag/AgCl (3 M KCl) as the counter and the reference electrode, respectively. All potentials measured were calibrated to reversible hydrogen electrode (RHE)

using the following equation: $E_{RHE}=E_{Ag/AgCl}+0.197$ V+0.059×pH. All measurements were carried out at a scan rate of 5 mV s$^{-1}$. Tafel plots were derived from OER and HER polarization curves obtained at a scan rate of 0.1 mV s$^{-1}$ and 95% corrected iR drop using NiCoFe/NF as the working electrode. Chronopotentiometric and chronoamperometric measurements were obtained under the same experimental setup without compensating iR drop. The iR drop was determined automatically with the potentiostat. For the two-electrode bulk water electrolysis system, NiCoFe/NF was employed as both the anode and cathode.

Comparison of NiCo/NF Versus NiCoFe/NF

Figure 15:
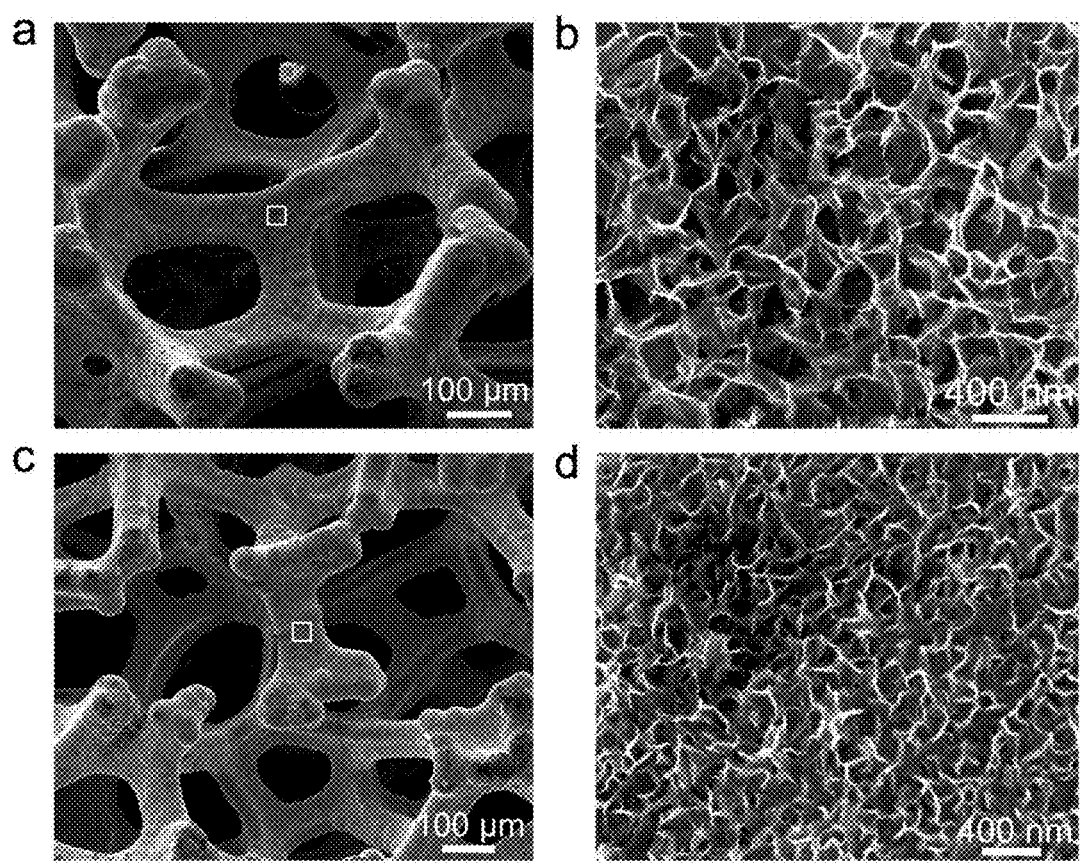
FIG. 15 shows SEM images of (a) NiCo/NF and (c) NiCoFe/NF. (b) and (d) are SEM images of the square marked in (a) and (c) under high magnifications, respectively.
Figure 16:
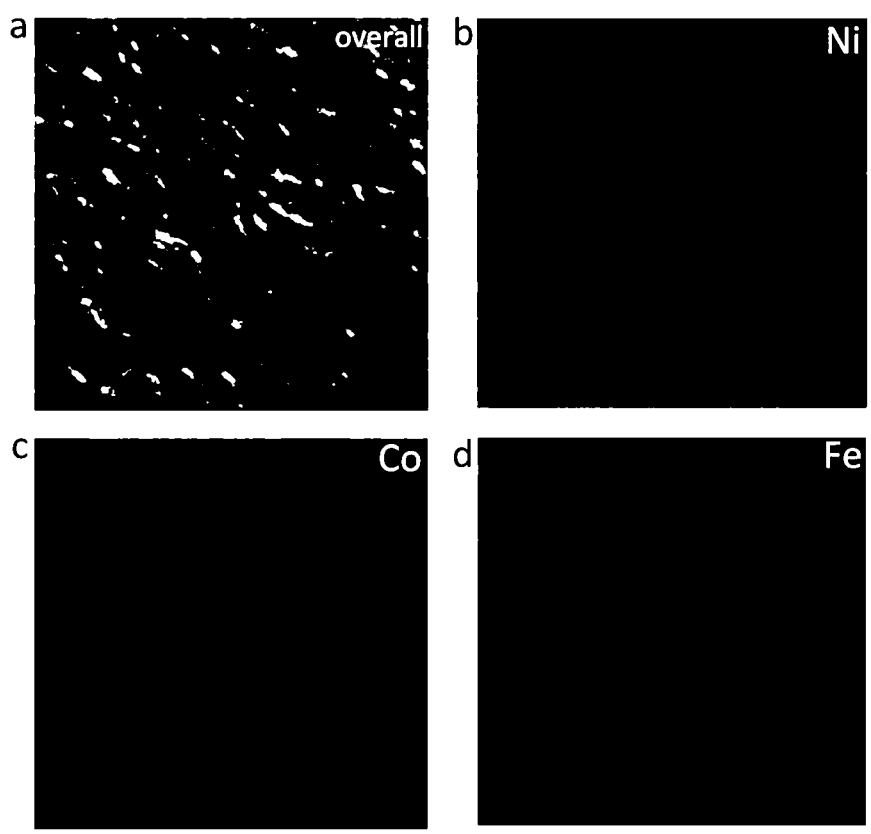
FIG. 16 shows elemental mapping of the NiCoFe/NF composite, (a) nickel (b) cobalt (c) iron and (d) oxygen, obtained with TOF-SIMS. The scale of all the four images is 20 μm×20 μm.
Figure 17:
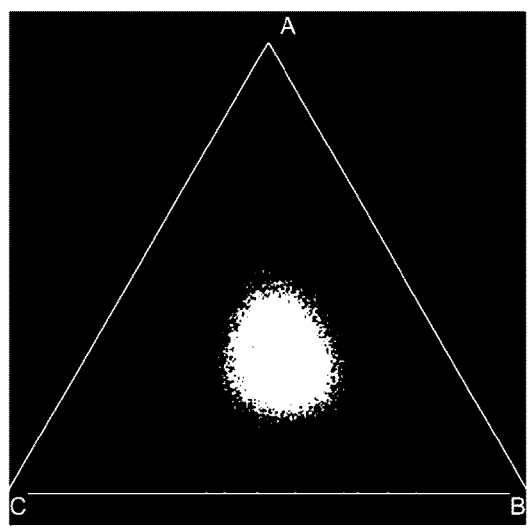
FIG. 17 show the ternary intensity histogram of Ni, Co and Fe in the NiCoFe/NF composite derived from FIG. 16.

FIG. 15a shows the scanning electron microscopy (SEM) image of the NiCo bimetallic composite deposited on nickel foam (NiCo/NF) from the electrolyte containing equal molar (2.5 mM) of Ni$^{2+}$ and Co$^{2+}$. The macroscopic 3D structure of NF enables a full utilization of its interior area, offering a larger surface area than other commonly used substrates such as carbon paper, platinum plate and conductive glasses. A film of the composite is uniformly deposited onto the 3D skeleton (i.e. three dimensional porous interpenetrating substrate) of NF without blocking the pores. FIG. 15b displays the high magnification SEM image of the small area selected in FIG. 15a. The deposited NiCo film exhibits a macroporous structure with highly curved and rippled, but interconnected nanoflakes. The macropores have sizes ranging from 100 nm~200 nm, which enhances the contact between electrolytes and the active catalysts surface area. Incorporating of iron into the NiCo composite will not induce significant morphological change of the deposits on NF. FIGS. 15c and 15d represent the SEM images of the trimetallic NiCoFe composites deposited on NF (NiCoFe/NF) from the electrolyte containing equal molar (1.67 mM) of Ni$^{2+}$, Co$^{2+}$ and Fe$^{3+}$ (hereafter mentioned as NiCoFe/NF). The NiCoFe is also deposited uniformly on the NF, forming highly curved and rippled nanoflakes (FIG. 15d), which resembles the NiCo. The elemental distributions of the three metal components in the NiCoFe composite are determined by Time-of-Flight secondary ion mass spectrometry (TOF-SIMS). Indexing in respective blue, green and red, Ni, Co and Fe are all found to distribute homogeneously in the NiCoFe composite (FIG. 16). Furthermore, from the ternary intensity histogram derived from FIG. 16, it can be concluded that in the NiCoFe composite, Ni and Co contents are close to identical, which are higher than the Fe content (FIG. 17).

Figure 18:
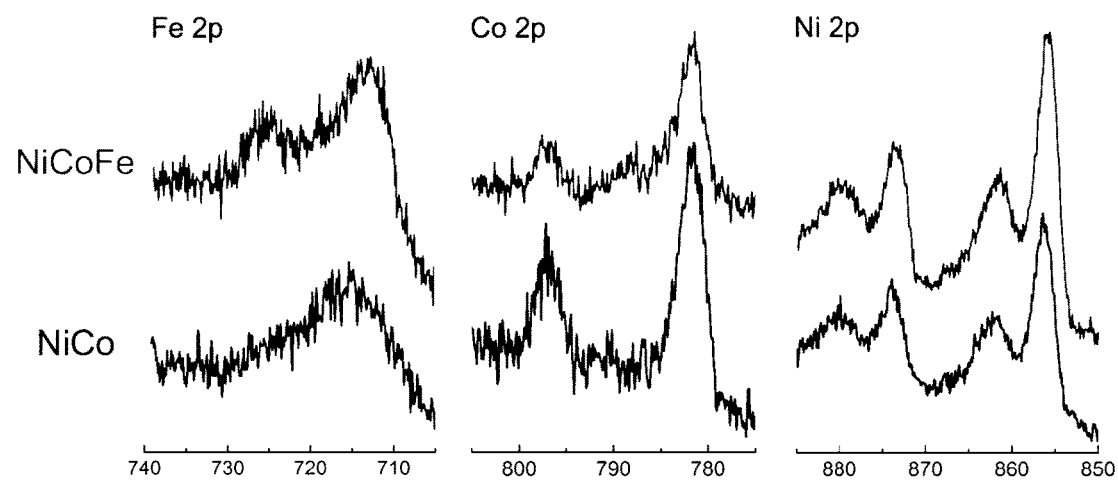
FIG. 18 shows iron, cobalt and nickel 2p regions of XPS spectra obtained from the NiCoFe and NiCo composites deposited on NF.

The chemical compositions of the NiCoFe/NF composite are analyzed by X-ray photoelectron spectroscopy (XPS). The XPS results of NiCo/NF are also adopted for comparison purpose. The two composites exhibit almost identical Co 2p and Ni 2p peaks (FIG. 18). The Co 2p peaks can be fitted into two spin orbits, which belong to the Co 2p$_{3/2}$ at 781.7 eV and Co 2p$_{1/2}$ at 797.2 eV, respectively. Besides that, the energy separation between these two peaks is 15.5 eV, which is in good agreement with the data obtained for Co(OH)$_2$. In the case of Ni 2p, two major peaks are detected at 857.2 eV and 874.8 eV, which belong to the spin orbit of Ni 2p$_{3/2}$ and Ni 2p$_{1/2}$, respectively. These two peaks have an energy separation of 17.6 eV, and are accompanied by two shake-up satellites, which are characteristic for the formation of Ni(OH)$_2$. The distinction between the XPS spectra of NiCoFe/NF and NiCo/NF is observed in the Fe 2p spectrum, where NiCo/NF shows a broad and insidious peak, indicating the absence of Fe element in this composite. For comparison, in the NiCoFe/NF composite, the Fe 2p peak can be fitted into the Fe 2p$_{3/2}$ and Fe 2p$_{1/2}$ spin orbit at 712 eV and 725 ev, respectively, with a minor shake-up satellite in-between. These data indicate that Fe is successfully incorporated into the NiCoFe composite, and presents mainly in the Fe$^{3+}$ oxidation state.

Figure 19:
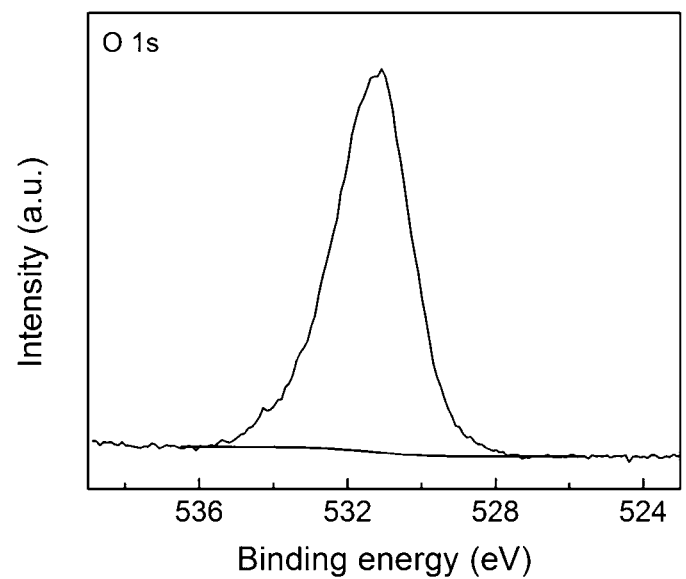
FIG. 19 show the high resolution O 1s XPS survey spectrum obtained with the NiCoFe/NF composite.

Additionally, the O 1s XPS spectrum of the NiCoFe/NF only exhibits one strong peak at 532.3 eV (FIG. 19), corresponding to the bound hydroxide groups. These collective data suggest that trimetallic NiCoFe hydroxide composite is formed on the NF substrate. Moreover, the atomic ratio of Ni, Co and Fe in the composite is determined to be ~1:1:0.3 by performing the XPS characterization with NiCoFe composites deposited on platinum plate, to bypass the strong signal interference arisen from the NF substrate. This data correlates well with the results obtained from TOF-SIMS.

Figure 20:
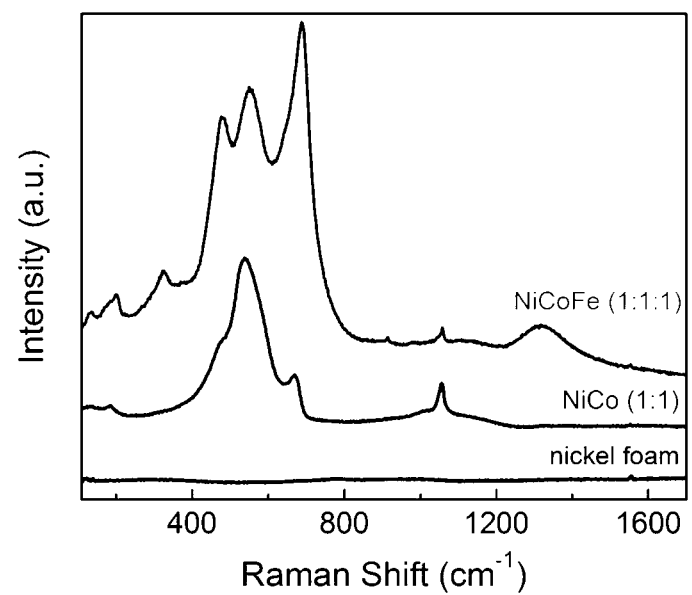
FIG. 20 shows Raman spectra of nickel foam, NiCo/NF and NiCoFe/NF employing an argon-ion laser with an incident wavelength of 514.5 nm.

The chemical compositions of the composite electrodes are also characterized by Raman spectroscopy (FIG. 20). NF alone does not exhibit any significant peaks within the range tested. After the deposition of NiCo, two new peaks are observed at 453 and 534 cm$^{-1}$, which are ascribed to the symmetric Ni—OH stretching and the vibration of the Ni—O stretching. Besides, the vibrational mode of Co(OH)$_2$ is also detected at 683 cm$^{-1}$, confirming a successful preparation of NiCo composites on NF. For the NiCoFe/NF composite, two additional peaks are observed at ~210 cm$^{-1}$ and 327 cm$^{-1}$, which are typical vibration peaks of Fe(OH)$_3$ and Fe—O, also indicating the successful preparation of NiCoFe/NF.

Figure 21:
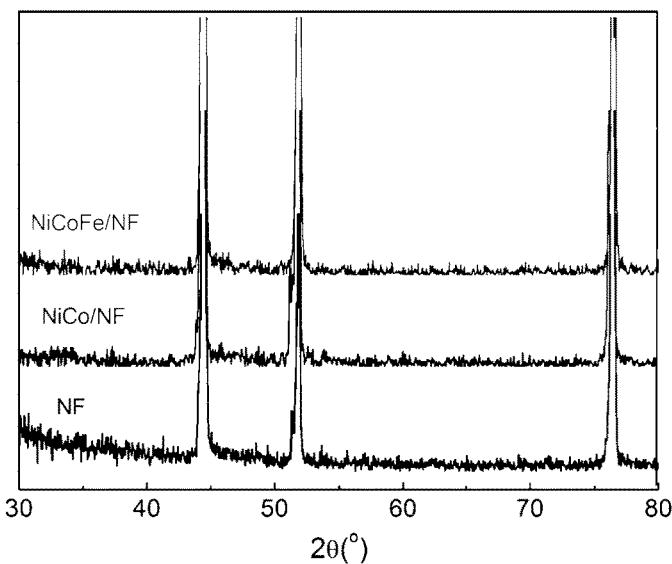
FIG. 21 shows wide angle XRD patterns of nickel foam, NiCo/NF and NiCoFe/NF, respectively.

FIG. 21 represents the XRD patterns of NiCoFe/NF and NiCo/NF. The bare NF is included as a comparison. For all the samples tested herein, only three diffraction peaks at 44.5°, 51.8° and 76.4° are detected, which belong to the nickel (111), (200) and (220) diffraction peaks. No characteristic diffraction peaks belonging to the hydroxides of Ni, Co and Fe, or their composites, are detected. This phenomenon indicates that the as-deposited NiCoFe and NiCo composites on NF are amorphous. The NiCoFe nanoflake layer may have an average width around 200 nm.

Electrochemical Performances of NiCoFe/NF for OER

Figure 22:
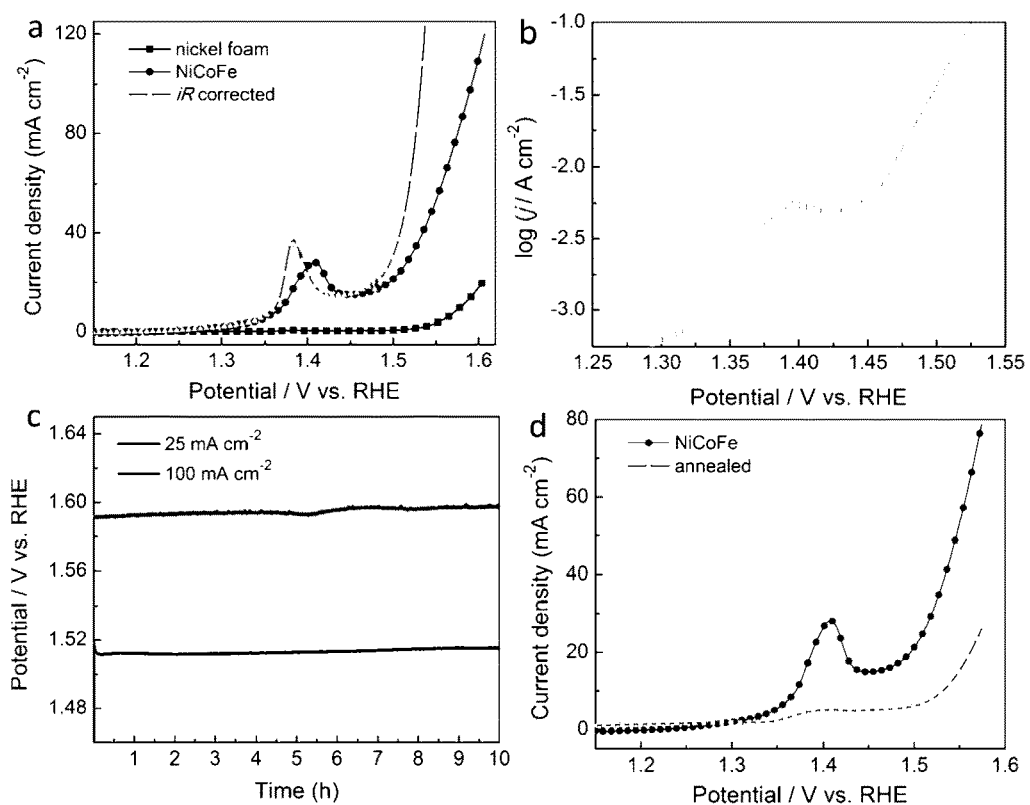
FIG. 22 shows oxygen evolution performances of the NiCoFe/NF electrode. (a) OER polarization curves of NiCoFe/NF in 1 M KOH solution obtained at 5 mV s$^{-1}$. Pure nickel foam is included for comparison. (b) Tafel plot obtained for NiCoFe/NF composite in 1 M KOH at 0.1 mV s$^{-1}$ with 95% iR compensation. (c) Chronoamperometric measurements of the NiCoFe/NF composite in 1 M KOH obtained at constant current densities of 25 and 100 mA cm$^{-2}$, respectively. (d) OER polarization curves obtained at 5 mV s$^{-1}$ with NiCoFe/NF before and after 2 h of annealing at 300° C. in 1 M KOH solution.

The electrocatalytic OER performances of the NiCoFe/NF electrode are evaluated in 1 M KOH using a standard three-electrode cell, employing NiCoFe/NF as the working electrode, a Ag/AgCl (3 M KCl) as the reference electrode and a Pt wire as the counter electrode. All potentials measured in this study are calibrated to the reversible hydrogen electrode (RHE) for comparison purpose. As shown in FIG. 22a, the onset of OER is observed at 1.45 V, corresponding to an overpotential of merely 220 mV. The oxidation peak prior to OER is ascribed to the oxidative formation of catalytic active NiOOH and CoOOH sites. The iR corrected curve displays an identical onset potential but much higher current densities at the same applied voltages. At 1.53 V ($\eta$=300 mV), a current density of 100 mA cm$^{-2}$ can be achieved. The high OER activity of NiCoFe/NF is ascribed to the trimetallic NiCoFe hydroxide deposited on NF, since pure NF exhibits no detectable OER catalytic activity even at a potential as high as 1.55 V (FIG. 22a). FIG. 22b represents the Tafel plot of NiCoFe/NF obtained at a slow scan rate of 0.1 mV s$^{-1}$, to minimize the influence of the Ni$^{2+}$ and Co$^{2+}$ oxidation processes. Useful information including the onset of linearity ($E_{cat}$) and Tafel slope, are obtained from the Tafel plot. The $E_{cat}$ is the potential where the linear dependence of potential on current density starts, representing the initiation of water oxidation. After the linear part, the current density is limited by the electron transfer kinetic and mass transport. The $E_{cat}$ derived from the Tafel plot is 1.45 V, which is similar to the Ni, Co and Fe oxide composites reported by Smith et. al. [Smith R D L, Prevot M S, Fagan R D, Zhang Z P, Sedach P A, Siu M K T, et al. *Photochemical Route for Accessing Amorphous Metal Oxide Materials for Water Oxidation Catalysis. Science* 2013, 340(6128): 60-63]. According to the Tafel plot, the potential required to obtain a current density of 10 mA cm$^{-2}$ is 1.47 V, which corresponds to an overpotential of only 240 mV. The Tafel plot has a slope of 50 mV dec$^{-1}$ and remains good linearity even under high current density of 100 mA cm$^{-2}$, indicating the good electrical contact between the deposited NiCoFe composites and the NF substrates.

The OER catalytic activity of NiCoFe/NF is also compared with some advanced OER electrocatalysts reported previously and the results are summarized in Table 3 and Table 4. NiCoFe/NF requires the lowest overpotential (240 mV) to deliver a current density of 10 mA cm$^{-2}$, a value relative to solar fuel synthesis because this current density roughly matches the spectrum for a 10% efficient solar-to-fuel device, among all the catalysts listed in Table 3. Furthermore, the superior OER catalytic activity of NiCoFe/NF is verified by using electrochemical active surface area (ECAS) according to the methods established previously, and the results are summarized in Table 4. At the same overpotential of 350 mV, NiCoFe/NF exhibits the highest current density using either geometric surface area (GSA) or ECAS, which is more than one magnitude higher than the benchmark IrO$_x$ catalyst, and is also superior to other non-precious metal based OER catalysts. The collective data indicate that the NiCoFe/NF is one of the most active OER catalysts in alkaline media reported so far.

Figure 23:
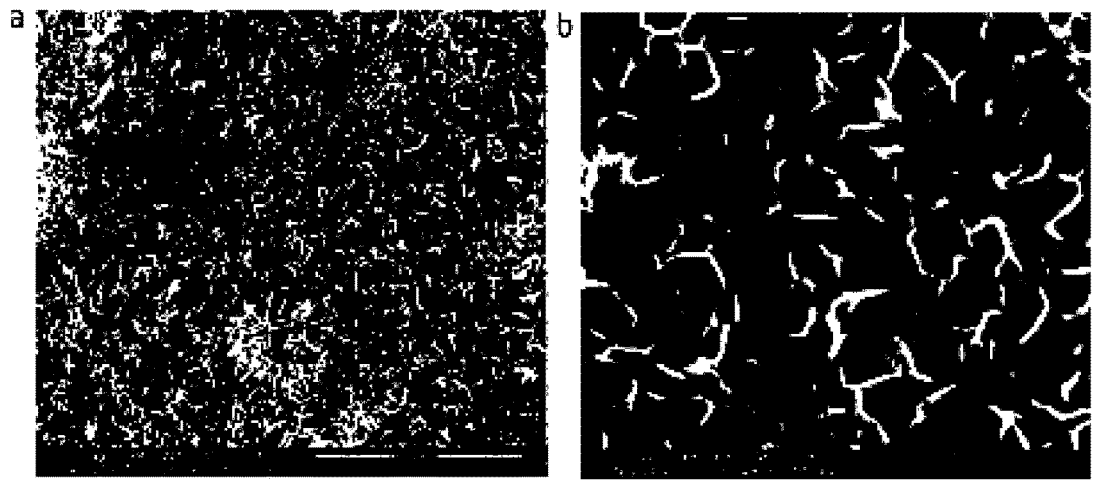
FIG. 23. SEM images of the NiCoFe/NF composites after 50 h of bulk water electrolysis under (a) low and (b) high magnifications.

The long-term stability of NiCoFe/NF under OER is evaluated in prolonged bulk electrolysis of water. FIG. 22c shows the chronopotentiometric curves obtained with NiCoFe/NF at current densities of 25 and 100 mA cm$^{-2}$, respectively. A potential of 1.51 V is required to deliver a current density of 25 mA cm$^{-2}$, which remains constant during the 10 h of water electrolysis. At a much higher current density of 100 mA cm$^{-2}$, the potential starts with ~1.59 V, and also remains stable (<5 mV increment) during the 10 h electrolysis. The physical stability of NiCoFe/NF in OER is further confirmed by SEM. FIG. 23 shows the SEM images of the NiCoFe/NF electrode after 50 h of bulk water electrolysis. The morphology of the deposited NiCoFe composite remains essentially unchanged. The above data show the NiCoFe/NF is a stable catalyst for OER.

FIG. 22d represents the OER polarization curves obtained with NiCoFe/NF before and after 2 h of annealing at 300° C. The heating treatment has severely impaired the OER catalytic activity of NiCoFe/NF, showing ~50 mV positively shifted onset potential and significantly lowered current density obtained at a given potential. This observation suggests the advantages of utilizing amorphous structures over their crystalline compartments in electrochemical applications, which is in accordance to the results obtained in other studies.

Electrochemical Performances of NiCoFe/NF for HER

Figure 24:
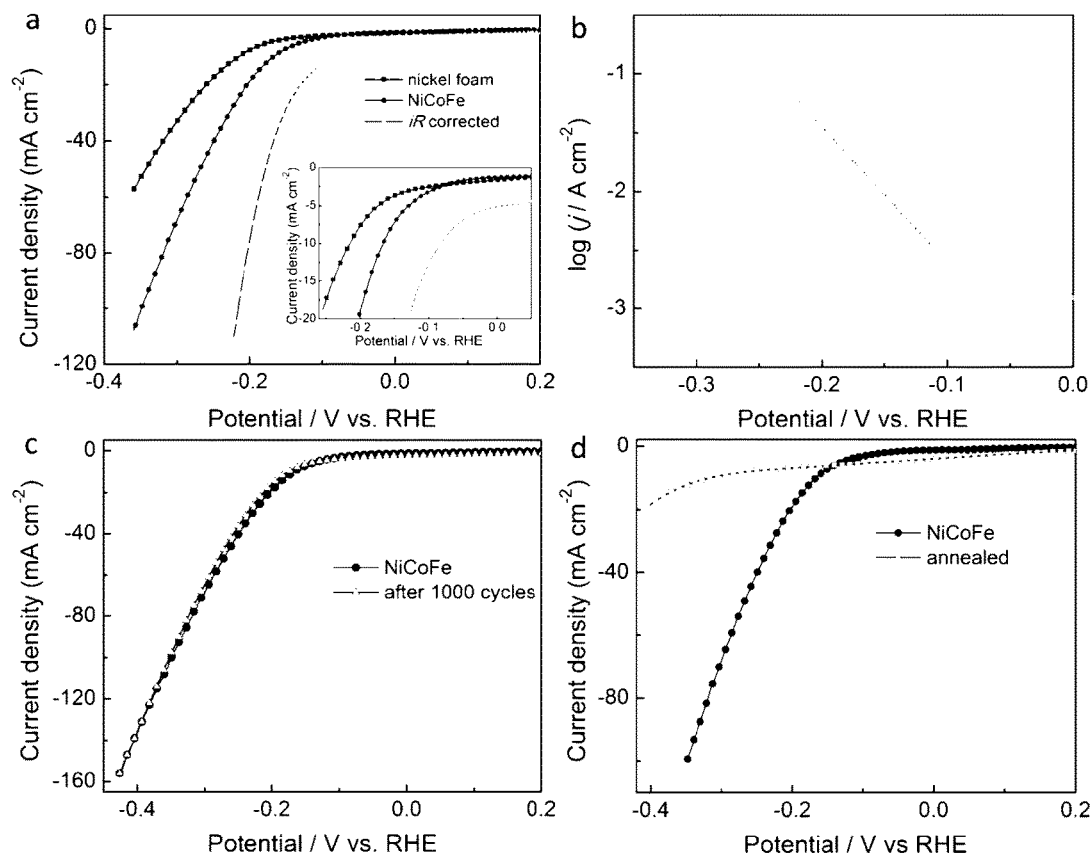
FIG. 24 shows hydrogen evolution performances of the NiCoFe/NF electrode. (a) HER polarization curves of NiCoFe/NF in 1 M KOH solution at 5 mV s$^{-1}$. Pure nickel foam is adopted as a comparison. (b) Tafel plot of the NiCoFe/NF composite in 1 M KOH at 0.1 mV s$^{-1}$ with 95% iR compensation. (c) HER polarization curves of NiCoFe/NF obtained before and after 1000 potential scans from 0.45 V to −0.55 V in 1 M KOH solution at 5 mV s$^{-1}$. (d) HER polarization curves obtained in 1 M KOH solution at 5 mV s$^{-1}$ with NiCoFe/NF before and after 2 h of annealing at 300° C.

HER is the counter reaction of OER in water electrolysis and requires relatively low overpotential. Pt is the best HER electrocatalyst reported so far, which can deliver large current densities at small overpotentials. However, for scalable applications of water electrolysis, it is also desirable to replace the precious Pt with earth abundant metals. In this study, the NiCoFe/NF electrode is also applied as the working electrode for HER using the same experimental setup for OER. FIG. 24a represents the HER polarization curves obtained with the NiCoFe/NF electrode. The iR corrected curve shows an HER onset of −0.05 V (inset in FIG. 24a), corresponding to an overpotential of merely 50 mV, and a current density of 80 mA cm$^{-2}$ is obtained at −0.2 V. The high HER activity is attributed to the NiCoFe composite deposited on NF, as the pure NF shows a significantly lower HER catalytic performance compared with the NiCoFe/NF (FIG. 24a). The Tafel slope of NiCoFe/NF in HER is 80 mV dec$^{-1}$ (FIG. 24b), which is similar to other non-precious metal-based catalysts such as CuMoS, NiMo, and NiCo. The stability of NiCoFe/NF in HER is prominent, with identical polarization curves obtained even after 1000 cycles of voltage scan in the range of −0.45V to 0.55V (FIG. 24c). FIG. 24d represents the effect of annealing on the HER performance of NiCoFe/NF. Similar to OER, the HER catalytic activity of NiCoFe/NF is also dramatically decreased after the annealing treatment, further indicating the benefits of utilizing amorphous NiCoFe/NF in water electrolysis.

Figure 25:
FIG. 25 shows the setup of two-electrode water electrolysis system employing NiCoFe/NF as both the anode and the cathode. Compared with the NiCoFe/NF in cathode, the NiCoFe/NF in anode exhibited a darker color due to the formation of NiOOH and CoOOH prior to OER.
Figure 26:
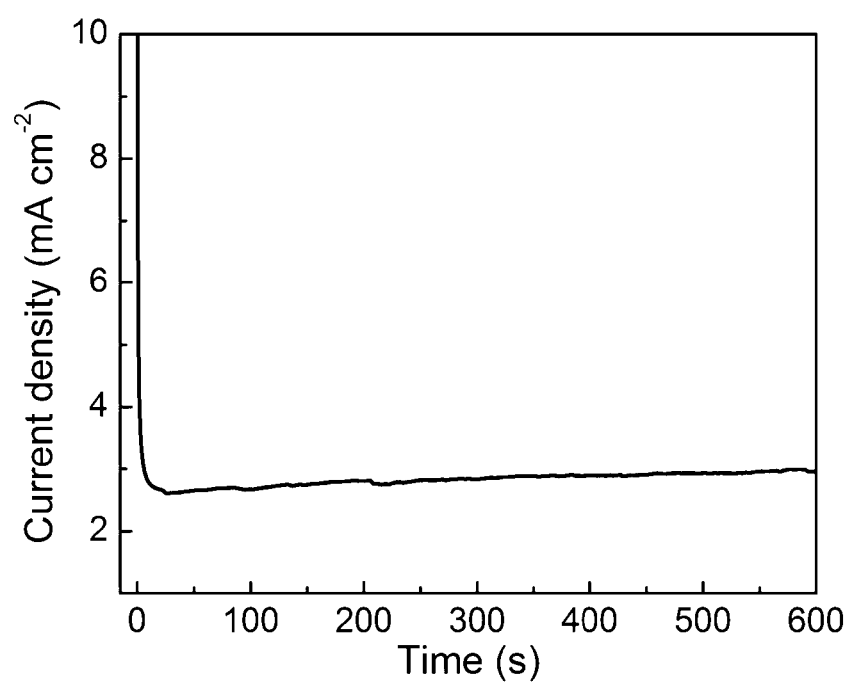
FIG. 26 shows chronopotentiometric measurements obtained with the two-electrode system (employing NiCoFe/NF as both the anode and the cathode) in 1 M KOH at 1.53 V.
Figure 27:
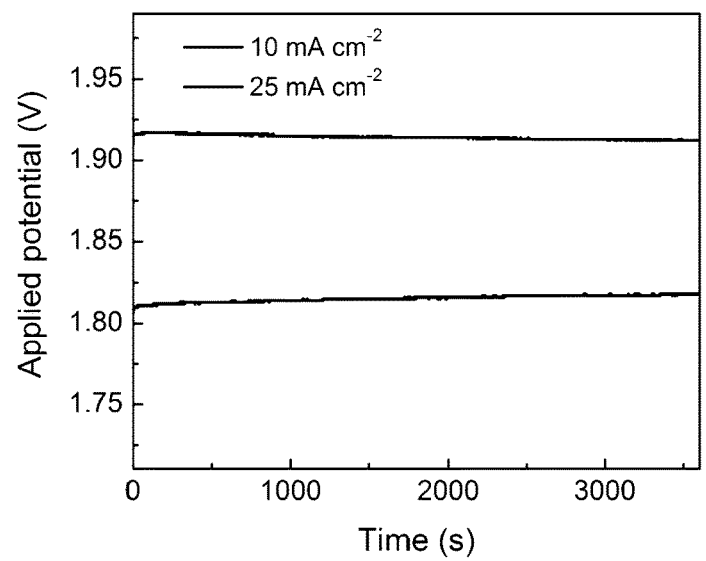
FIG. 27 shows chronoamperometric measurements obtained with the two-electrode system (employing NiCoFe/NF as both the anode and the cathode) in 1 M KOH at current densities of 25 and 10 mA cm$^{-2}$, respectively.

Since the NiCoFe/NF electrode exhibits phenomenal catalytic activity towards OER and HER, it can be employed as both the anode and the cathode for a two-electrode water electrolysis system (FIG. 25). As a consequence, the energy efficiency delivered by the NiCoFe/NF electrode during water electrolysis can be determined. FIG. 26 displays the chronopotenitometric curve obtained with the NiCoFe/NF electrode in 1 M KOH. The overall water electrolysis reaction can be initiated at applied voltages higher than 1.50 V, with the observation of continuous and stable evolution of bubbles on both the anode and cathode. At an applied cell potential of 1.53 V, a stabilized current density around 3 mA cm$^{-2}$ is achieved corresponding to an overall cell overpotential of 300 mV and an energy efficiency of 80.4%. FIG. 27 shows the chronoamperometric curves obtained with the NiCoFe/NF electrodes at current densities of 10 and 25 mA cm$^{-2}$, respectively. Both curves are very stable during the 1 h reaction session, indicating the prominent stability of the electrode in water electrolysis. The potential required to deliver current densities of 10 and 25 mA cm$^{-2}$ are 1.81 and 1.92 V, corresponding to the respective energy efficiency of 68.0% and 64.1%. The decreased energy efficiencies under higher current densities is mainly attributed to the enhanced iR drop arisen from the resistance of solution.

Figure 28:
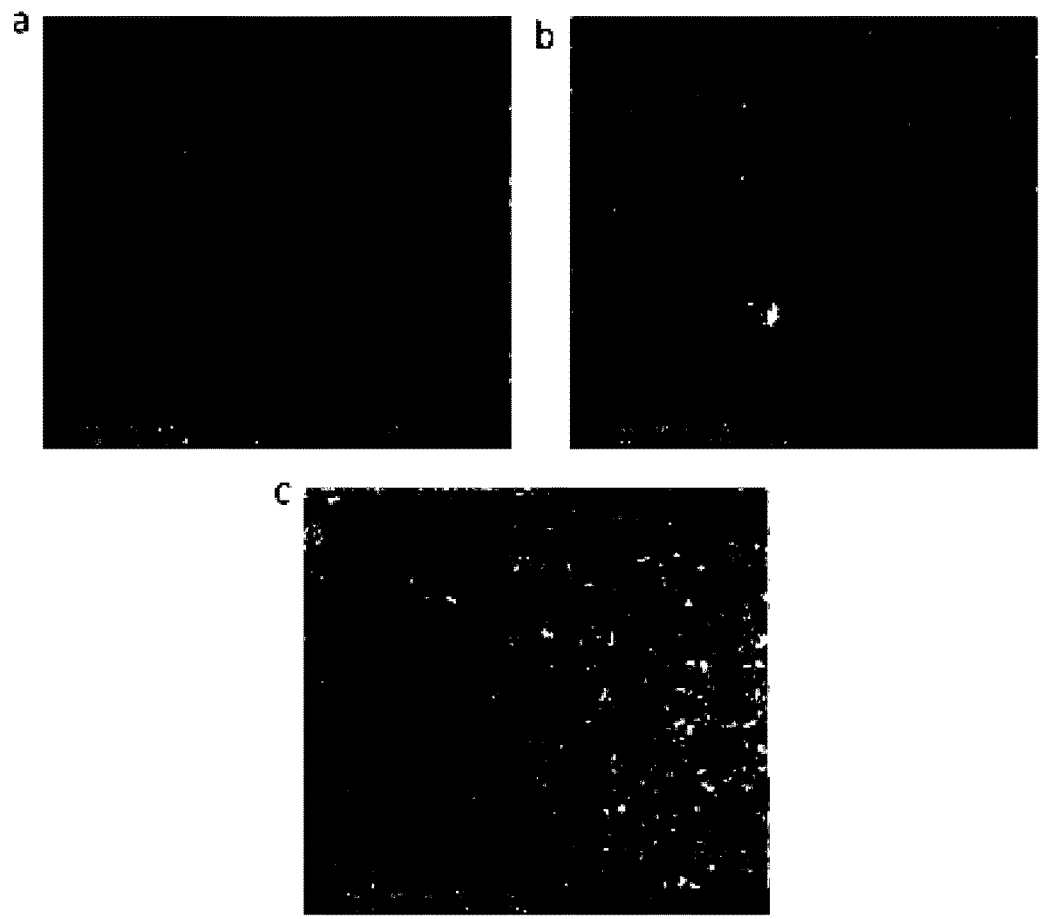
FIG. 28 shows SEM images of the NiCoFe/NF composites deposited from electrolytes containing $Ni^{2+}$, $Co^{2+}$ and $Fe^{3+}$ ions at ratios of (a) 1:1:0.2, (b) 1:1:1.5, (c) 1:1:3, respectively.
Figure 29:
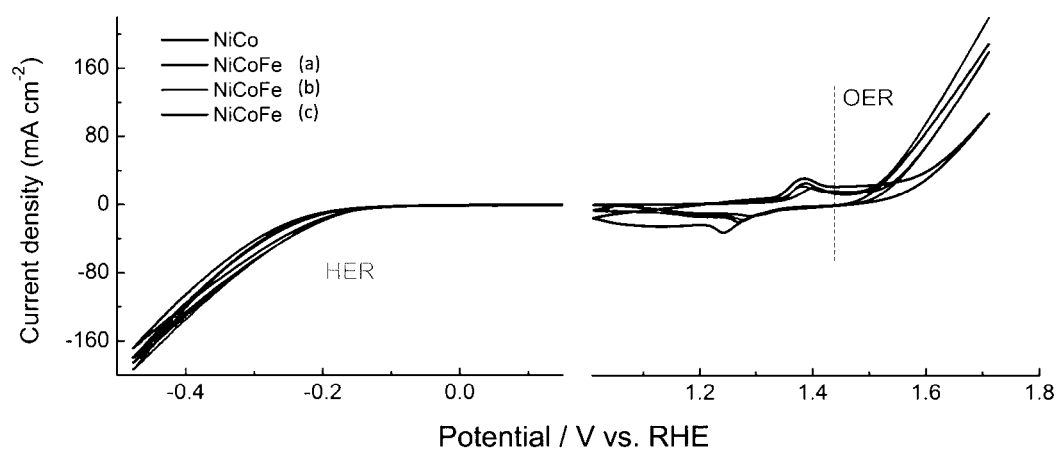
FIG. 29 shows the effect of iron on the electrochemical performances of the composites electrode prepared. CVs of NiCo bimetallic and NiCoFe trimetallic hydroxide composites with different Fe content deposited on nickel foam obtained in 1 M KOH solution at 5 mV s$^{-1}$. NiCoFe composites were prepared from electrolytes containing $Ni^{2+}$, $Co^{2+}$ and $Fe^{3+}$ ions at ratios of (a) 1:1:0.5, (b) 1:1:1 and (c) 1:1:1.5, respectively.

The role of Fe in affecting the electrochemical performances of NiCoFe/NF To investigate the role of Fe in affecting the electrochemical performance of the NiCoFe/NF electrodes prepared, a series of NiCoFe trimetallic hydroxide composites with different Fe content are prepared by varying the molar ratio of Ni$^{2+}$, Co$^{2+}$ and Fe$^{3+}$ in the electrolytes for sample electrodeposition, and their structures and corresponding electrochemical performances compared. At a low Fe content, the trimetallic composite exhibits the nanoflake structure (FIGS. 15b, 15d and 28a). With progressively increased Fe content, the NiCoFe composite gradually transformed to a nanosheet structure (FIG. 28b-c), showing smaller pores and lower surface roughness. The electrochemical performances of these NiCoFe/NF composites are evaluated with cyclic voltammograms (CVs) as shown in FIG. 29. With the increasing of Fe content, the thickness of the coating decreases, since it has transformed from nanoflakes to nanosheets.

The bimetallic NiCo/NF composite exhibits reversible redox process regarding the formation of NiOOH and CoOOH with large areal current densities, which is a promising electrode material for pseudo-capacitors. The NiCo electrode is also a promising catalyst material for supercapacitors, since it exhibited large and symmetric redox peaks during CV scans. Incorporation of Fe into NiCo composites on the one hand significantly suppresses the redox processes, resulting in smaller current densities, therefore degrades its performance for pseudo-capacitors. On the other hand, the OER catalytic activity has been enhanced dramatically in the presence of Fe. All composites containing Fe exhibit superior OER catalytic performance to the NiCo/NF, showing negatively shifted onset potentials and higher current densities obtained at a given potential (FIG. 29). NiCoFe/NF prepared from electrolytes containing equal molar of $Ni^{2+}$, $Co^{2+}$ and $Fe^{3+}$ (1.67 mM) has the highest OER catalytic activity, while a further increase in Fe content leads to receded performances. The effect of Fe in the composites can be explained as follows. The presence of Fe tends to lower the average oxidation state of Ni and Co in NiOOH and CoOOH, therefore greatly suppresses the $M(OH)_2$ to MOOH (M=Ni and Co) redox processes and lowers its performance as an electrode material for pseudo-capacitors. The suppression of the oxidation of $M(OH)_2$ to MOOH results in higher OER activities, since the OER activity of M cations is higher the lower the average oxidation states of M, similar to the results where β-NiOOH, for which Ni exists as $Ni^{3+}$, exhibits a much higher OER activity than γ-NiOOH for which Ni exists as $Ni^{3.7+}$. However, the presence of excessive Fe will sacrifice the catalytic active Co and Ni sites, therefore lowers the OER performance. The effect of Fe towards HER is not as significant as that in OER. All samples exhibit high catalytic activity in HER, with little change upon the variation of Fe content (FIG. 29). Nevertheless, the highest activity is also obtained with the NiCoFe/NF prepared from electrolytes containing equal molar of $Ni^{2+}$, $Co^{2+}$ and $Fe^{3+}$, makes it a highly promising electrode for both OER and HER in water electrolyzers.

TABLE 3

Comparisons of OER overpotentials of NiCoFe/NF with other advanced OER catalysts in 1M KOH solution to obtain a current density of 10 mA cm$^{-2}$.

| Materials | $j_{GSA}$/mA cm$^2$ | $j_{ECSA}$/mA cm$^2$ | η/mV | Reference |
| --- | --- | --- | --- | --- |
| NiCoFe/NF | 10$^a$ | 0.08$^a$ | 240 | Described herein |
| Co$_3$O$_4$/Graphene | 10 | n.a. | 310 | Liang et al |
| Ni$_{0.9}$Fe$_{0.1}$O$_x$ | 10 | n.a. | 336 | Trotochaud et al |
| NiFe-LDH/CNT | 10 | n.a. | 247 | Gong et al |

$^a$Determined by Tafel plot

Table 3 shows comparisons of OER overpotentials of NiCoFe/NF with that of Co$_3$O$_4$/Graphene [Liang Y Y, Li Y G, Wang H L, Zhou J G, Wang J, Regier T, et al. Co3O4 nanocrystals on graphene as a synergistic catalyst for oxygen reduction reaction. *Nat Mater* 2011, 10(10): 780-786], Ni$_{0.9}$Fe$_{0.1}$O$_x$ [Trotochaud L, Ranney J K, Williams K N, Boettcher S W. Solution-Cast Metal Oxide Thin Film Electrocatalysts for Oxygen Evolution. *J Am Chem Soc* 2012, 134(41): 17253-17261], and NiFe-LDH/CNT [Gong M, Li Y G, Wang H L, Liang Y Y, Wu J Z, Zhou J G, et al. An Advanced Ni—Fe Layered Double Hydroxide Electrocatalyst for Water Oxidation. *J Am Chem Soc* 2013, 135(23): 8452-8455].

TABLE 4

Comparisons of current densities of NiCoFe/NF with other advanced OER catalysts obtained in 1M KOH solution at a fixed overpotential of 350 mV.

| Materials | $j_{GSA}$/mA cm$^2$ | $j_{ECAS}$/mA cm$^2$ | η/mV | Reference |
| --- | --- | --- | --- | --- |
| NiCoFe/NF | 800$^a$ | 5.5$^a$ | 350 | Described herein |
| IrO$_x$ | 42 | 0.4 | 350 | McCrory et al |

TABLE 4-continued

Comparisons of current densities of NiCoFe/NF with other advanced OER catalysts obtained in 1M KOH solution at a fixed overpotential of 350 mV.

| Materials | $j_{GSA}$/mA cm$^2$ | $j_{ECAS}$/mA cm$^2$ | η/mV | Reference |
| --- | --- | --- | --- | --- |
| NiCoO$_x$ | 6 | 0.2 | 350 | McCrory et al |
| NiFeO$_x$ | 15 | 3 | 350 | McCrory et al |

$^a$Determined by Tafel plot

Table 4 shows comparisons of current densities of NiCoFe/NF with IrO$_x$, NiCoO$_x$ and NiFeO$_x$, [McCrory C C L, Jung S H, Peters J C, Jaramillo T F. Benchmarking Heterogeneous Electrocatalysts for the Oxygen Evolution Reaction. *J Am Chem Soc* 2013, 135(45): 16977-16987].

This embodiment of the invention, wherein the metallic composite layer comprises a trimetallic hydroxide composite containing Ni, Co and Fe can be obtained via a facile electrodeposition method. The catalytic assembly can be used as direct electrodes for OER as well as HER. These electrodes exhibit distinctive electrochemical performances upon the variations of Fe content, showing the highest catalytic activity when deposited from electrolytes comprised of equal molar of $Ni^{2+}$, $Co^{2+}$ and $Fe^{3+}$ (NiCoFe/NF). The results in this study suggest that the Fe content can be used as an indicator for the designing of NiCoFe trimetallic hydroxide composites towards specific applications. The NiCoFe/NF electrode is among the most active OER catalysts, which also exhibits a considerable high HER catalytic activity. As a consequence, the NiCoFe/NF electrode can be applied as both the anode and the cathode in a two-electrode water electrolysis system, and has the potential to substitute the precious Ru and Ir based anode and Pt based cathode materials in commercial water electrolyzers.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A catalytic assembly comprising
a porous electrically conductive substrate, and
a porous metallic composite coating the substrate to exhibit catalytic activity when electric charge is applied,
wherein the catalytic assembly has a three dimensional interpenetrating porous structure,
wherein the substrate has a three dimensional interpenetrating porous structure having a first average pore diameter ($PD_{SUB}$), and
the porous metallic composite is amorphous and has a three dimensional interpenetrating porous structure having a second average pore diameter ($PD_{PMC}$), the $PD_{PMC}$ being sufficiently smaller than the $PD_{SUB}$ to allow the porous metallic composite to coat substrate surfaces throughout the substrate including surfaces of pores in the substrate.

2. The catalytic assembly of claim 1 wherein the $PD_{PMC}$ ranges from approximately 5 nm to 300 nm.

3. The catalytic assembly of claim 2, wherein the porous metallic composite has a thickness of between approximately 5 nm and 100 nm.

4. The catalytic assembly of claim 3 wherein the porous metallic composite comprises at least one of nanosheets and nanoflakes.

5. The catalytic assembly of claim 3 wherein the $PD_{SUB}$ is in the range of approximately 50,000 nm to approximately 1,000,000 nm.

6. The catalytic assembly of claim 3 wherein the porous metallic composite comprises at least one metal.

7. The catalytic assembly of claim 6 wherein the at least one metal is a transition metal.

8. The catalytic assembly of claim 7 wherein the transition metal is a first-row transition metal.

9. The catalytic assembly of claim 6 wherein the metallic composite comprises a bimetallic composite.

10. The catalytic assembly of claim 9 wherein the bimetallic composite is selected from the group consisting of a nickel-iron composite, a nickel-cobalt composite, a manganese-iron composite, a manganese-cobalt composite, or a manganese-zinc composite.

11. The catalytic assembly of claim 6 wherein the porous metallic composite comprises a trimetallic composite.

12. The catalytic assembly of claim 11 wherein the trimetallic composite is selected from the group consisting of a nickel-cobalt-iron composite, a manganese-cobalt-nickel composite or a molybdenum-cobalt-nickel composite.

13. The catalytic assembly of claim 1 wherein the porous electrically conductive substrate is a foam.

14. The catalytic assembly of claim 13 wherein the foam is selected from the group consisting of nickel foam, aluminum foam, graphite foam, nickel-iron foam, copper foam or titanium foam.

15. A method of preparing a catalytic assembly, the method comprising the steps of:

(i) providing a porous electrically conductive substrate having a three dimensional interpenetrating porous structure and having a first average pore diameter (PDSUB), and (ii) coating substrate surfaces throughout the substrate including surfaces of the pores in the substrate with a porous metallic composite having a second average pore diameter (PDPMC); the porous metallic composite coating being adapted to eXhibit catalytic activity when electric charge is applied, and wherein step (ii) does not include the use of binders to adhere the porous metallic composite to substrate surfaces;

the porous metallic composite being amorphous and having a three dimensional interpenetrating porous structure, and the PDPMC being sufficiently smaller than the PDSUB to allow the porous metallic composite to coat surfaces of pores in the substrate, the catalytic assembly having a three dimensional interpenetrating porous structure.

16. The method of claim 15 wherein step (ii) comprises electrodepositing the porous metallic composite on to the substrate surfaces throughout the substrate including surfaces of pores in the substrate.

17. The method of claim 16 wherein electrodeposition of the porous metallic composite is carried out using an electrolyte bath which comprises equimolar electrolytes of $Ni^{2+}$, $Co^{2+}$, and $Fe^{2+}$.

18. The method of claim 16 wherein electrodeposition of the porous metallic composite is carried out using an electrolyte bath which comprises with x mM $Ni(NO_3)_2 \cdot 6H_2O$, x mM $Co(NO_3)_3 \cdot 6H_2O$ and y mM $Fe(NO_3)_3 \cdot 9H_2O$, where $2x+y=5$.

19. The method of claim 16 wherein electrodeposition of the porous metallic composite is carried out using an electrolyte bath which comprises equimolar electrolytes of $Ni^{2+}$ and $Fe^{2+}$.

20. The method of claim 19 wherein the electrolyte bath comprises 3 mM $Ni(NO_3)_2 \cdot 6H_2O$ and mM $Fe(NO_3)_3 \cdot 9H_2O$.

* * * * *

UNITED STATES PATENT AND TRADEMARK OFFICE
CERTIFICATE OF CORRECTION

PATENT NO. : 10,519,555 B2
APPLICATION NO. : 15/503390
DATED : December 31, 2019
INVENTOR(S) : Chuan Zhao and Xunyu Lu It is certified that error appears in the above-identified patent and that said Letters Patent is hereby corrected as shown below:

On the Title Page

Item [73]:
Delete "Innovation", and insert --Innovations--

In the Claims

Claim 15, under Column 28, Line 4:
Delete "PDSUB", and insert --PD$_{SUB}$--

Claim 15, under Column 28, Line 8:
Delete "PDPMC", and insert --PD$_{PMC}$--

Claim 15, under Column 28, Line 9:
Delete "eXhibit", and insert --exhibit--

Claim 15, under Column 28, Line 15:
Delete "PDPMC", and insert --PD$_{PMC}$--

Claim 15, under Column 28, Line 16:
Delete "PDSUB", and insert --PD$_{SUB}$--

Claim 20, under Column 28, Line 38:
Delete "mM Fe(NO$_3$)$_3$•9H$_2$O", and insert --3 mM Fe(NO$_3$)$_3$•9H$_2$O--

Signed and Sealed this
Twenty-sixth Day of May, 2020

Andrei Iancu
*Director of the United States Patent and Trademark Office*